US008386072B1

(12) United States Patent
Mihalik et al.

(10) Patent No.: US 8,386,072 B1
(45) Date of Patent: Feb. 26, 2013

(54) DUAL METER FILLER APPARATUS AND METHOD

(75) Inventors: Michael Mihalik, Cuyahoga Falls, OH (US); Duane Carlson, Munroe Falls, OH (US); James C. Loase, Rock Creek, OH (US); Michael Baker, Norton, OH (US); Michael Davis, Stow, OH (US)

(73) Assignee: Pneumatic Scale Corporation, Cuyahoga Falls, OH (US)

( * ) Notice: Subject to any disclaimer, the term of this patent is extended or adjusted under 35 U.S.C. 154(b) by 285 days.

(21) Appl. No.: 12/762,202

(22) Filed: Apr. 16, 2010

Related U.S. Application Data

(60) Provisional application No. 61/170,771, filed on Apr. 20, 2009.

(51) Int. Cl.
*G06F 17/00* (2006.01)

(52) U.S. Cl. ....................................... 700/233; 700/239

(58) Field of Classification Search .................. 700/233, 700/239
See application file for complete search history.

(56) References Cited

U.S. PATENT DOCUMENTS

| | | | | |
|---|---|---|---|---|
| 5,078,302 | A * | 1/1992 | Hellenberg | 222/144 |
| 6,793,387 | B1 * | 9/2004 | Neas et al. | 222/135 |
| 6,856,861 | B2 * | 2/2005 | Dirksing et al. | 700/239 |
| 7,082,970 | B2 * | 8/2006 | Bartholomew et al. | 222/144 |
| 7,311,223 | B2 * | 12/2007 | Post | 222/144 |
| 7,347,344 | B2 * | 3/2008 | Engels et al. | 222/144 |
| 7,433,752 | B2 * | 10/2008 | Eimann et al. | 700/123 |

* cited by examiner

*Primary Examiner* — Timothy Waggoner
(74) *Attorney, Agent, or Firm* — Walker & Jocke; Nancy J. Reeves

(57) ABSTRACT

A filler product supply system (5) and method using two or more conduits (120, 130) to deliver filler product under pressure from product reservoirs (200, 210) to in fluid isolation to a supply manifold (58). Filler product is further delivered in fluid isolation from supply manifold (58) through conduits (170, 171) to two or more filling heads (180, 190). Downstream from filling heads (180, 190), the previously isolated fluid lines are combined to introduce two or more distinct filler products into a single container without creating a homogenous mixture.

22 Claims, 38 Drawing Sheets

| | | | |
|---|---|---|---|
| | Production Control | Tank status | |
| | | Target fill weight and time | |
| | | Monoblock Controls | |
| | Conveyor Control | Control Screen for conveyor system | |
| | Sampled Data | Report Screen | |
| | Recirculation Pump Control | Control screen for two recirculation pumps | |
| Data/Reports | Process Data | Report Screen | |
| | Statistical Data | Report Screen | |
| | Recipe Report | Report Screen | |
| | Machine Lot Report | Report Screen | |
| | Head Lot Report | Report Screen | |
| | Fill Log Report | Report Screen | |
| | Reject Tracking | Report Screen | |
| | Last N Fills | Report screen | |
| Machine Setup | Maintenance Setup | Control Screen | |
| | Turret Control | Control Screen | |
| | Configure Machine | Control Screen | |
| | Encoder Setup | Control Screen | |
| | Encoder Zero | Report screen | |
| | Spindle Setup | Report Screen | |
| | Servo Setup | Servo-Diagnostics Screen | Report screens |
| | | Servo Enable Screen | Report/Control screen |
| | | Home Servos Screen | Control Screen |
| | | Jog Servos Screen | Report/Control screen |
| Filler Setup | Stationary Fill | Report/control screen | |
| | Meter Diagnostics | Report/control screen | Report screen with fault codes for each head |
| | Meter Parameters | Report/Control screen - modbus register address and parameter setting for each flow head. | |
| | Meter Setup | Low Flow cutoff adjustment | |
| | | initialization parameters | |
| | | zero point adjustment | |
| | Product Supply | control screen | |
| | Meter Communications | Report Screen | |
| | Supply Pump | Control Screen | |
| Recipe Control | Fill Editor | Control Screen - quantity/time portion of recipe editing | |
| | Servo Editor | Control Screen - servo portion of recipe editing | |
| | Flow Compensation | Control Screen - Compensation portion of recipe editing | |
| | Recipe Selection | Control Screen - Recipe Selection | |
| | AOC Training | Report Screen | |
| System Faults | Current System Fault Messages | Report Screen | |

Fig. 16

MACHINE LOT SUMMARY FOR RECIPE #: 7 K

LOT STARTED AT: 9 : 43 : 14 GCV 3 - 10 - 2008
LOT ENDED AT: 10 : 58 : 21 GCV 3 - 10 - 2008

| HEAD X | NUMBER OF FILLS | NUMBER LOW REJECTS | NUMBER HIGH REJECTS | STANDARD DEV. | AVERAGE WEIGHT | AVERAGE TIME | AVERAGE TEMP | AVERAGE DENSITY | COMP |
|---|---|---|---|---|---|---|---|---|---|
| 01 PRI | 0 | 0 | 0 | 0.0 | 0.0 | 0.00 | 23.5 | 0 998 | 0.0 |
| 01 SEC | 0 | 0 | 0 | 0.0 | 0.0 | 0.00 | 23.4 | 0.999 | 0.0 |
| 02 PRI | 0 | 0 | 0 | 0.0 | 0.0 | 0.00 | 23.5 | 0.997 | 0.0 |
| 02 SEC | 0 | 0 | 0 | 0.0 | 0.0 | 0.00 | 23.4 | 0.997 | 0.0 |
| 03 PRI | 0 | 0 | 0 | 0.0 | 0.0 | 0.00 | 23.3 | 1.000 | 0.0 |
| 03 SEC | 0 | 0 | 0 | 0.0 | 0.0 | 0.00 | 23.6 | 0.999 | 0.0 |
| 04 PRI | 0 | 0 | 0 | 0.0 | 0.0 | 0.00 | 23.5 | 0.997 | 0.0 |
| 04 SEC | 0 | 0 | 0 | 0.0 | 0.0 | 0.00 | 23.7 | 0.996 | 0.0 |
| 05 PRI | 0 | 0 | 0 | 0.0 | 0.0 | 0.00 | 22.8 | 1.000 | 0.0 |
| 05 SEC | 0 | 0 | 0 | 0.0 | 0.0 | 0.00 | 23.4 | 0.997 | 0.0 |
| 06 PRI | 0 | 0 | 0 | 0.0 | 0.0 | 0.00 | 23.3 | 1.000 | 0.0 |
| 06 SEC | 0 | 0 | 0 | 0.0 | 0.0 | 0.00 | 23.5 | 1.001 | 0.0 |
| 07 PRI | 0 | 0 | 0 | 0.0 | 0.0 | 0.00 | 22.9 | 1.000 | 0.0 |
| 07 SEC | 0 | 0 | 0 | 0.0 | 0.0 | 0.00 | 23.4 | 0.996 | 0.0 |
| 08 PRI | 0 | 0 | 0 | 0.0 | 0.0 | 0.00 | 23.6 | 0.991 | 0.0 |
| 08 SEC | 0 | 0 | 0 | 0.0 | 0.0 | 0.00 | 23.3 | 0.996 | 0.0 |
| 09 PRI | 0 | 0 | 0 | 0.0 | 0.0 | 0.00 | 23.5 | 1.005 | 0.0 |
| 09 SEC | 0 | 0 | 0 | 0.0 | 0.0 | 0. 00 | 23.1 | 0.999 | 0.0 |

HEAD 1 - 9 FILL LOG REPORT 11 : 0 : 13 CN 3 . 10 . 2008

RECIPE 7 K

| PRODUCT FEED | FILL WEIGHT GRAMS | | AVG. FILL WGT GRAMS | FILL TIME SECONDS | TEMPERATURE CELSIUS | DENSITY GRAMS ml | COMP GRAMS |
|---|---|---|---|---|---|---|---|
| 01 PRIMARY | 0.0 | | 0.0 | 0.00 | 19.4 | 0.998 | 0.00 |
| 01 SECONDARY | | 0.0 | 0.0 | 0.00 | 19.0 | 0.995 | 0.00 |
| 02 PRIMARY | 0.0 | | 0.0 | 0.00 | 19.0 | 0.998 | 0.00 |
| 02 SECONDARY | | 0.0 | 0.0 | 0.00 | 18.4 | 0.998 | 0.00 |
| 03 PRIMARY | 0.0 | | 0.0 | 0.00 | 17.5 | 0.997 | 0.00 |
| 03 SECONDARY | | 0.0 | 0.0 | 0.00 | 17.3 | 0.997 | 0.00 |
| 04 PRIMARY | 0.0 | | 0.0 | 0.00 | 17.7 | 0.996 | 0.00 |
| 04 SECONDARY | | 0.0 | 0.0 | 0.00 | 17.3 | 0.996 | 0.00 |
| 05 PRIMARY | 0.0 | | 0.0 | 0.00 | 17.6 | 0.996 | 0.00 |
| 05 SECONDARY | | 0.0 | 0.0 | 0.00 | 17.3 | 1.000 | 0.00 |
| 06 PRIMARY | 0.0 | | 0.0 | 0.00 | 23.6 | 0.998 | 0.00 |
| 06 SECONDARY | | 0.0 | 0.0 | 0.00 | 23.7 | 1.000 | 0.00 |
| 07 PRIMARY | 0.0 | | 0.0 | 0.00 | 23.4 | 1.000 | 0.00 |
| 07 SECONDARY | | 0.0 | 0.0 | 0.00 | 23.6 | 0.999 | 0.00 |
| 08 PRIMARY | 0.0 | | 0.0 | 0.00 | 23.8 | 0.999 | 0.00 |
| 08 SECONDARY | | 0.0 | 0.0 | 0.00 | 23.5 | 0.997 | 0.00 |
| 09 PRIMARY | 0.0 | | 0.0 | 0.00 | 23.6 | 1.006 | 0.00 |
| 09 SECONDARY | | 0.0 | 0.0 | 0.00 | 23.4 | 1.000 | 0.00 |

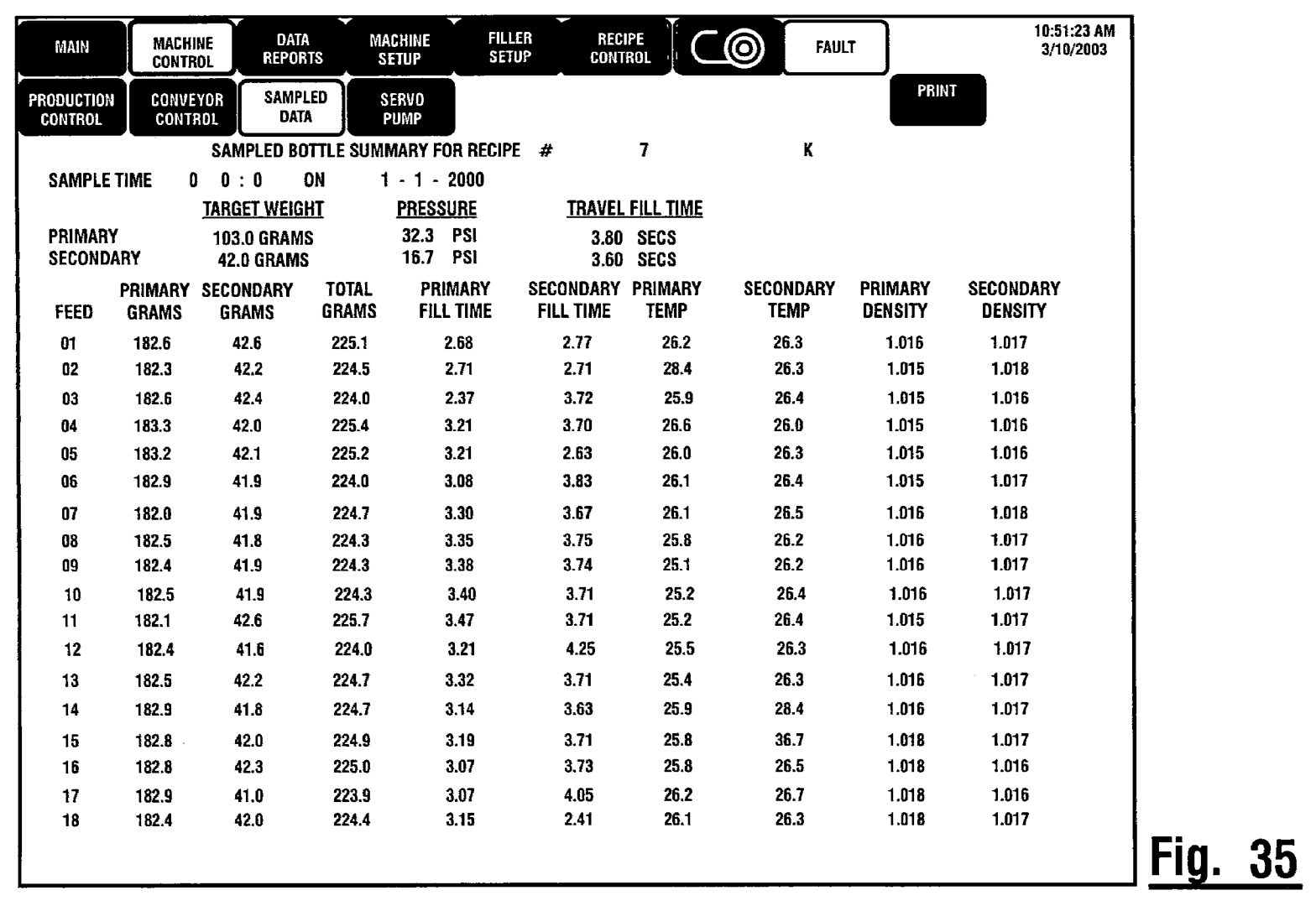

MAIN | MACHINE CONTROL | DATA REPORTS | MACHINE SETUP | FILLER SETUP | RECIPE CONTROL | FAULT

10:51:23 AM
3/10/2003

PRODUCTION CONTROL | CONVEYOR CONTROL | SAMPLED DATA | SERVO PUMP

PRINT

SAMPLED BOTTLE SUMMARY FOR RECIPE # 7 K

SAMPLE TIME 0 0 : 0 ON 1 - 1 - 2000

| | TARGET WEIGHT | PRESSURE | TRAVEL FILL TIME |
|---|---|---|---|
| PRIMARY | 103.0 GRAMS | 32.3 PSI | 3.80 SECS |
| SECONDARY | 42.0 GRAMS | 16.7 PSI | 3.60 SECS |

| FEED | PRIMARY GRAMS | SECONDARY GRAMS | TOTAL GRAMS | PRIMARY FILL TIME | SECONDARY FILL TIME | PRIMARY TEMP | SECONDARY TEMP | PRIMARY DENSITY | SECONDARY DENSITY |
|---|---|---|---|---|---|---|---|---|---|
| 01 | 182.6 | 42.6 | 225.1 | 2.68 | 2.77 | 26.2 | 26.3 | 1.016 | 1.017 |
| 02 | 182.3 | 42.2 | 224.5 | 2.71 | 2.71 | 28.4 | 26.3 | 1.015 | 1.018 |
| 03 | 182.6 | 42.4 | 224.0 | 2.37 | 3.72 | 25.9 | 26.4 | 1.015 | 1.016 |
| 04 | 183.3 | 42.0 | 225.4 | 3.21 | 3.70 | 26.6 | 26.0 | 1.015 | 1.016 |
| 05 | 183.2 | 42.1 | 225.2 | 3.21 | 2.63 | 26.0 | 26.3 | 1.015 | 1.016 |
| 06 | 182.9 | 41.9 | 224.0 | 3.08 | 3.83 | 26.1 | 26.4 | 1.015 | 1.017 |
| 07 | 182.0 | 41.9 | 224.7 | 3.30 | 3.67 | 26.1 | 26.5 | 1.016 | 1.018 |
| 08 | 182.5 | 41.8 | 224.3 | 3.35 | 3.75 | 25.8 | 26.2 | 1.016 | 1.017 |
| 09 | 182.4 | 41.9 | 224.3 | 3.38 | 3.74 | 25.1 | 26.2 | 1.016 | 1.017 |
| 10 | 182.5 | 41.9 | 224.3 | 3.40 | 3.71 | 25.2 | 26.4 | 1.016 | 1.017 |
| 11 | 182.1 | 42.6 | 225.7 | 3.47 | 3.71 | 25.2 | 26.4 | 1.015 | 1.017 |
| 12 | 182.4 | 41.6 | 224.0 | 3.21 | 4.25 | 25.5 | 26.3 | 1.016 | 1.017 |
| 13 | 182.5 | 42.2 | 224.7 | 3.32 | 3.71 | 25.4 | 26.3 | 1.016 | 1.017 |
| 14 | 182.9 | 41.8 | 224.7 | 3.14 | 3.63 | 25.9 | 28.4 | 1.016 | 1.017 |
| 15 | 182.8 | 42.0 | 224.9 | 3.19 | 3.71 | 25.8 | 36.7 | 1.018 | 1.017 |
| 16 | 182.8 | 42.3 | 225.0 | 3.07 | 3.73 | 25.8 | 26.5 | 1.018 | 1.016 |
| 17 | 182.9 | 41.0 | 223.9 | 3.07 | 4.05 | 26.2 | 26.7 | 1.018 | 1.016 |
| 18 | 182.4 | 42.0 | 224.4 | 3.15 | 2.41 | 26.1 | 26.3 | 1.018 | 1.017 |

Fig. 35

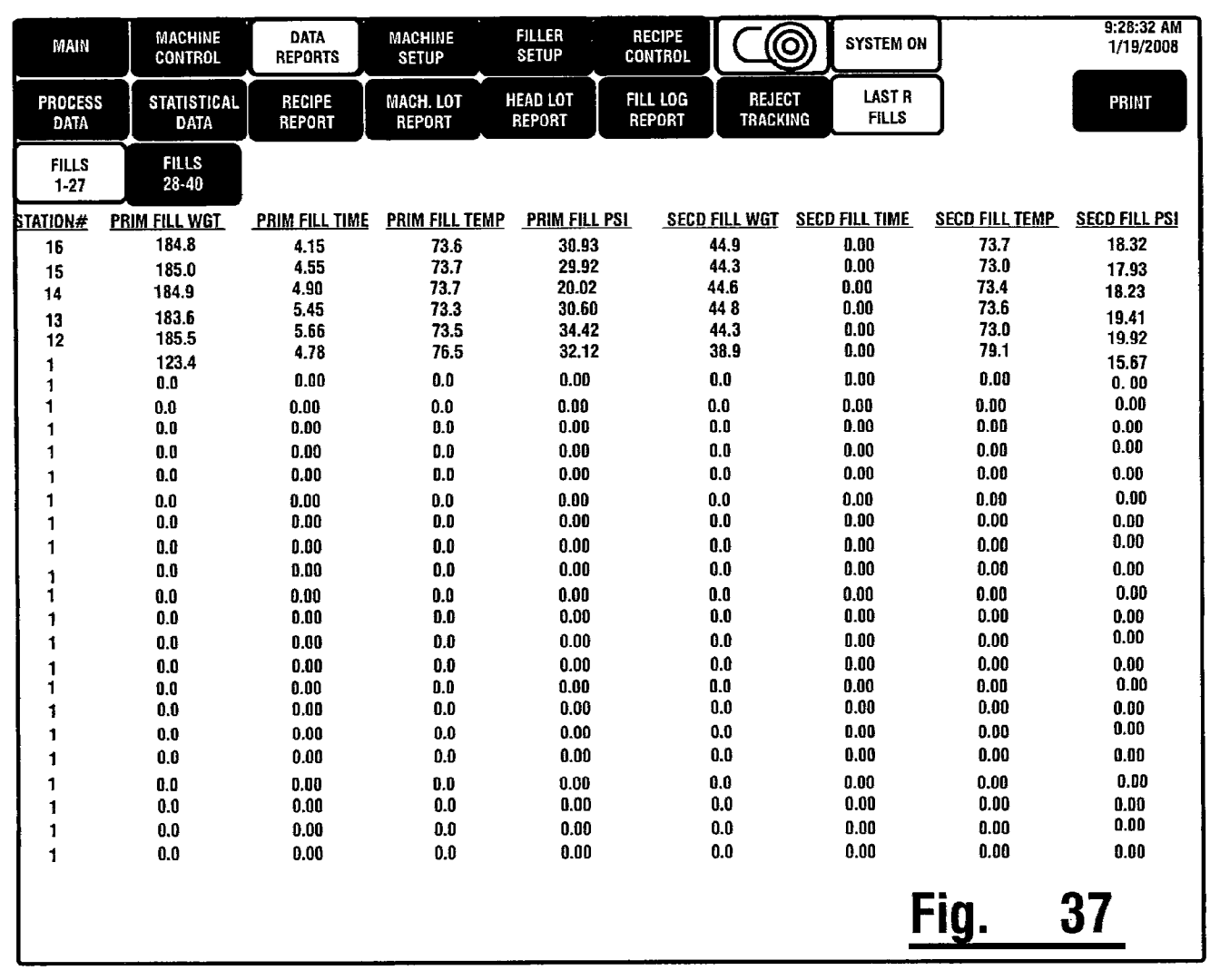

MAIN | MACHINE CONTROL | DATA REPORTS | MACHINE SETUP | FILLER SETUP | RECIPE CONTROL | SYSTEM ON | 9:28:32 AM 1/19/2008

PROCESS DATA | STATISTICAL DATA | RECIPE REPORT | MACH. LOT REPORT | HEAD LOT REPORT | FILL LOG REPORT | REJECT TRACKING | LAST R FILLS | PRINT

FILLS 1-27 | FILLS 28-40

| STATION# | PRIM FILL WGT | PRIM FILL TIME | PRIM FILL TEMP | PRIM FILL PSI | SECD FILL WGT | SECD FILL TIME | SECD FILL TEMP | SECD FILL PSI |
|---|---|---|---|---|---|---|---|---|
| 16 | 184.8 | 4.15 | 73.6 | 30.93 | 44.9 | 0.00 | 73.7 | 18.32 |
| 15 | 185.0 | 4.55 | 73.7 | 29.92 | 44.3 | 0.00 | 73.0 | 17.93 |
| 14 | 184.9 | 4.90 | 73.7 | 20.02 | 44.6 | 0.00 | 73.4 | 18.23 |
| 13 | 183.6 | 5.45 | 73.3 | 30.60 | 44 8 | 0.00 | 73.6 | 19.41 |
| 12 | 185.5 | 5.66 | 73.5 | 34.42 | 44.3 | 0.00 | 73.0 | 19.92 |
| 1 | 123.4 | 4.78 | 76.5 | 32.12 | 38.9 | 0.00 | 79.1 | 15.67 |
| 1 | 0.0 | 0.00 | 0.0 | 0.00 | 0.0 | 0.00 | 0.00 | 0. 00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |
| 1 | 0.0 | 0.00 | 0.0 | 0.00 | 0.0 | 0.00 | 0.00 | 0.00 |

Fig. 37

DUAL METER FILLER APPARATUS AND METHOD

CROSS REFERENCE TO RELATED APPLICATIONS

This application claims benefit under 35 U.S.C. §119(e) of U.S. Provisional Application 61/072,277 filed Apr. 20, 2009. The disclosures of this Application are herein incorporated by reference in their entirety.

TECHNICAL FIELD

This invention relates to a filler product supply system and method. More specifically this invention relates to a filler product supply system and method for filling a single container with at least two fluids which differ, at least in appearance, from each other.

BACKGROUND ART

Bottles and other containers for products, particularly liquids, are generally filled in high volume operations using a filler assembly. Typically such bottles and other containers are filled with a liquid which has a uniform appearance. There are times, however, when it is desirable to fill bottles or containers with two or more products, each having a different composition and/or appearance from the other without creating a homogeneous mixture during the filling process. Thus there exists a need for a product supply system and method of filling bottles or other containers with two or more different products, particularly liquid products, which permits the user to vary the appearance and ratio of the two or more component products within the resulting filled bottle or container.

DISCLOSURE OF INVENTION

It is an object of the present invention to provide a product supply system and method for filling a bottle or other container simultaneously with two or more different liquids.

It is a further object of the present invention to provide a product supply system for filling a bottle or other container simultaneously with two or more different liquids, which apparatus is capable of being adjusted to control the approximate ratio of the component products in the resulting filled container.

It is a further object of the present invention to provide a method for filling a bottle or other container simultaneously with two or more different liquids with a product supply system which permits adjusting and controlling the ratio of the component products in the resulting filled container.

It is a further object of the present invention to provide a product supply system for filling a bottle or other container simultaneously with two or more different liquids which apparatus is capable being adjusted to control the appearance of the comingled component products in the resulting filled container.

It is a further object of the present invention to provide a method for filling a bottle or other container simultaneously with two or more different liquids with a product supply system which permits adjusting and controlling the appearance of the component products in the resulting filled container.

It is a further object of the present invention to provide a product supply system for filling a bottle or other container simultaneously with two or more different liquids which apparatus is capable being adjusted to create regions within the filled container which vary in product ratio or appearance from one region to another.

It is a further object of the present invention to provide a method for filling a bottle or other container simultaneously with two or more different liquids with a product supply system which includes adjusting the operation from region to region to create regions within the filled container which vary in product ratio or appearance from one region to another.

The foregoing objects are accomplished in an embodiment of the invention by an apparatus and method which uses a plurality of product conduits to supply product to each container, with each conduit associated with a flowmeter and filling head controlled by a controller. The controller, such as a programmable logic controller or PLC, monitors and controls each flowmeter individually, and in cooperation with all other flowmeters for such container. The apparatus is adapted to use one or more recipes to control exemplary characteristics associated with filling each container, such as target weight for each individual product component and for the container as a whole, overweight and underweight tolerances; product weight compensation, product supply pressure, percent underfill, product ratio, product lead or delay of start or end time, fill rate, container rotation, and fill regions within the container. The apparatus is further adapted to fill each container according to such recipes, using one or more feedback loops to ensure that each container is filled in accordance with the recipe.

Further objects of the present invention will be made apparent in the following Best Mode For Carrying Out Invention and the appended claims.

BRIEF DESCRIPTION OF DRAWINGS

FIG. 16 is a spreadsheet showing the logical relationships between each of the levels of control or data provided in an exemplary program associated with the exemplary product supply system of FIG. 1

FIG. 35 is an exemplary Machine Control-Sampled Data screen of an exemplary program associated with the product supply system of FIG. 1.

FIG. 37 is an exemplary Data Reports-Last N Fills-Fills 1-27 screen of an exemplary program associated with the product supply system of FIG. 1.

BEST MODE FOR CARRYING OUT INVENTION

Figure 1:
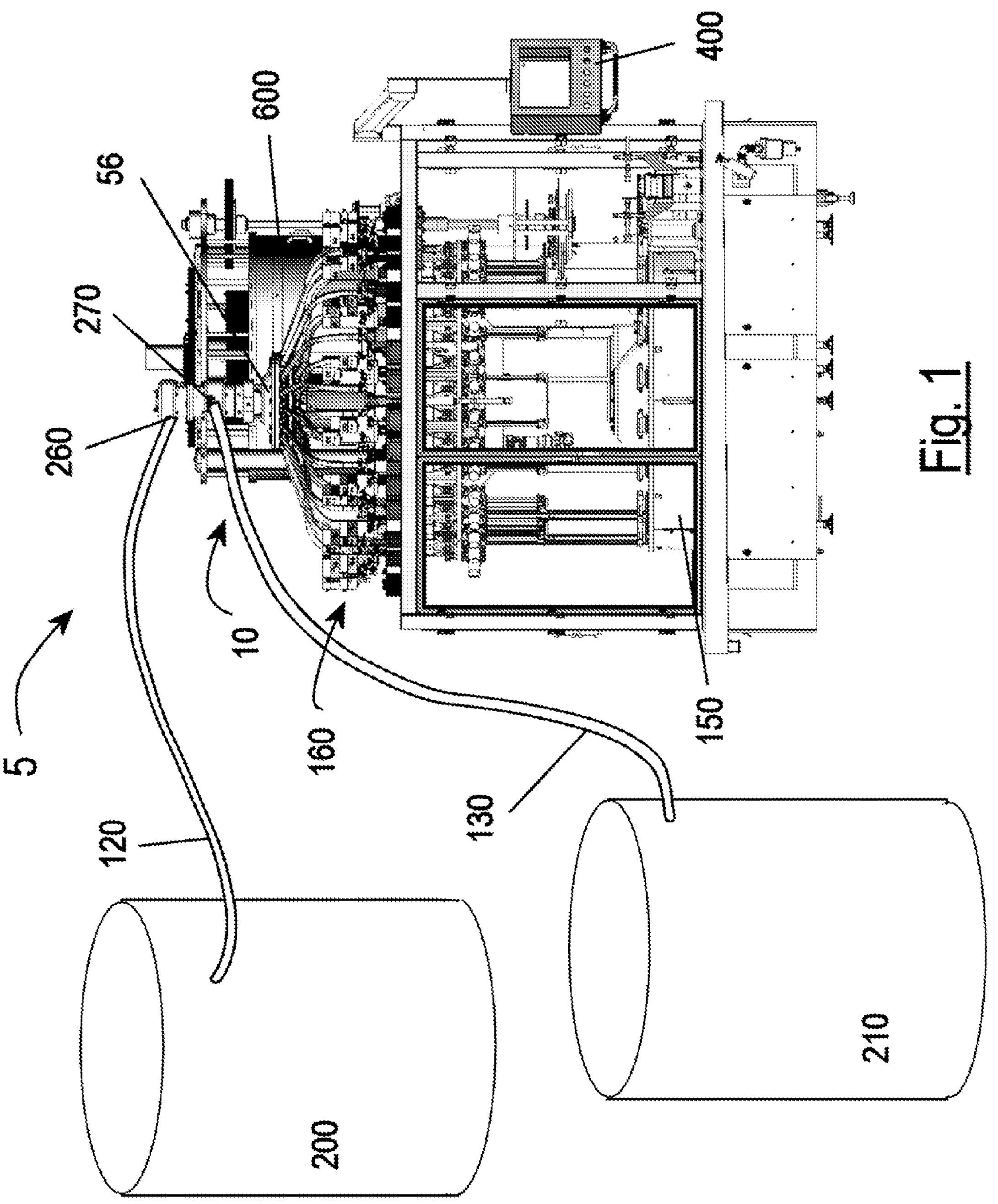
FIG. 1 is a perspective view of one embodiment of an exemplary filler product supply system.

An exemplary embodiment of a product supply system 5 is shown in FIG. 1. A product supply system 5 includes a filler assembly 10. As more clearly seen in FIG. 3, filler assembly 10 includes a rotary union portion 56, center column portion 140, a lower turret 150 (FIG. 1) and an upper turret 160. Filler assembly 10 is in fluid connection with product supply lines 120, 130, which transport filler product from reservoirs of filler product 200, 210. Filler product is maintained at relatively constant levels within the reservoirs 200, 210 and is supplied to filler assembly 10 under pressure. General structures of a rotary or other product supply systems for filling containers with a single product are well known and are described in whole or in part in U.S. Pat. Nos. 6,065,508 and 5,161,586, which are hereby incorporated by reference in their entirety. Although the system and method for controlled filling of containers with two products, and the corresponding apparatus features associated with the delivery of two products, are expressly discussed herein the apparatus could also be modified without undue experimentation to permit the controlled delivery of more than two products to a container being filled.

The exemplary embodiment of a product supply system 5 also includes an operator station 400 in operative communication with one or more PLCs. The term "PLC" is used throughout for simplicity, but is interchangeable in each instance with the term "programmable controller," or "controller." In addition, a PLC may be replaced in each instance by a more versatile computer so long as the more versatile computer is at least capable of the functionality associated with PLCs. Among other things, the operator station 400 is programmed to carry out a recipe using specific filling parameters, which it implements using one or more PLCs to control the mechanical components of the product supply system 5. In the exemplary embodiment illustrated, the mechanical components within the product supply system 5 are controlled by a single PLC 330, and the filler product level in the reservoirs 200, 210 are controlled by the first PLC and one in the customer's supply system. In other embodiments the components could also be controlled by a plurality of PLCs which are each operatively connected to the operator station 400, directly or through a network.

The exemplary product supply system 5 also includes a variety of other components, not specifically discussed herein, including a capper 600, and various conveyance mechanisms to move the containers within the system. Those skilled in the art will be able to identify and substitute functionally equivalent components, or to add components which perform functions that supplement those performed by the components expressly described herein.

Figure 2:
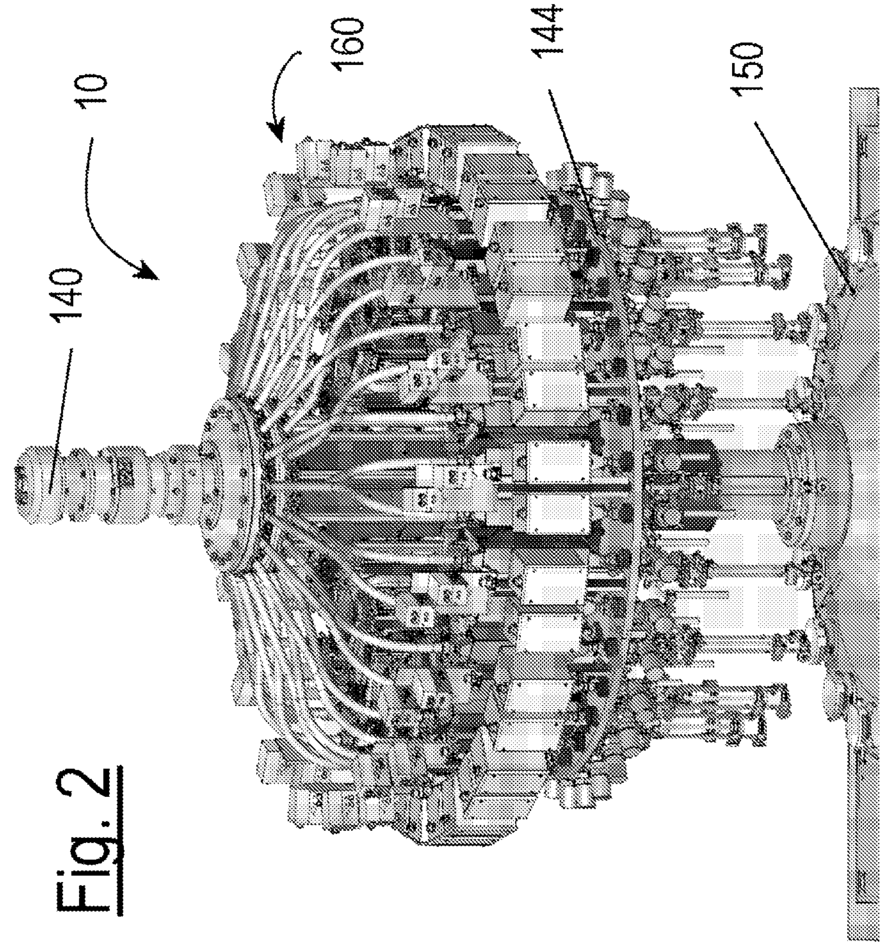
FIG. 2 is a perspective view of one embodiment of an exemplary filler assembly with eighteen filling stations.
Figure 3:
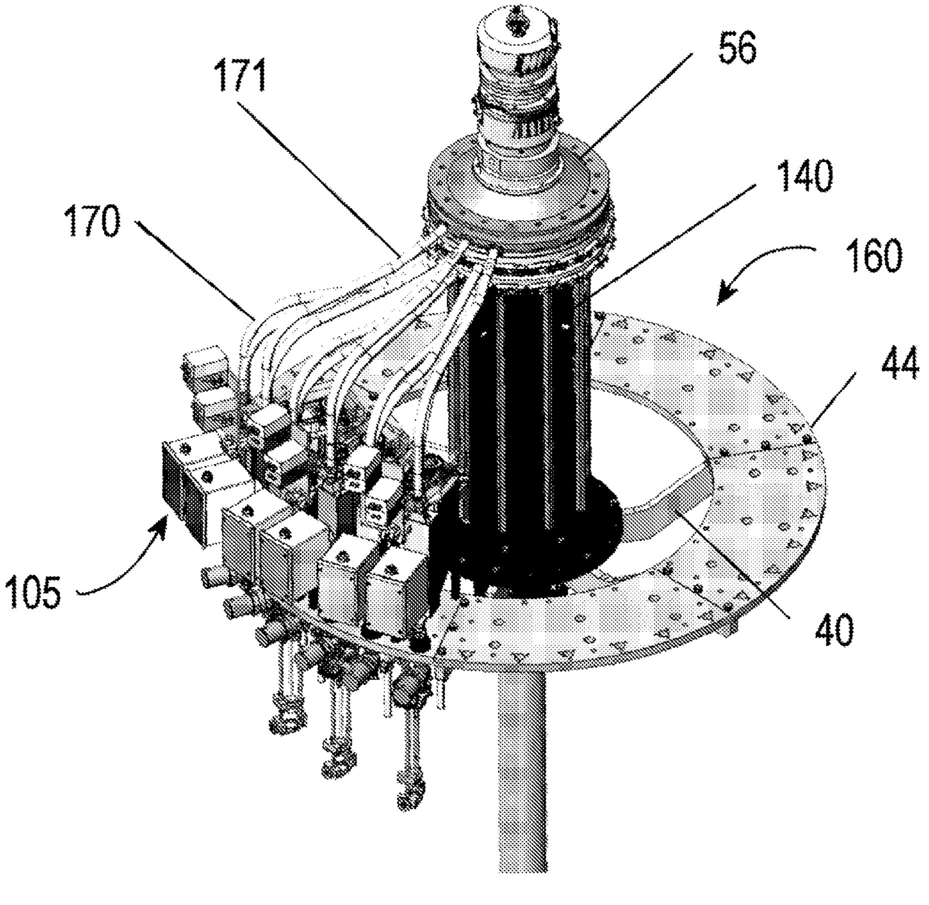
FIG. 3 is a perspective view of one embodiment of an exemplary filler assembly with three filling stations installed.
Figure 9:
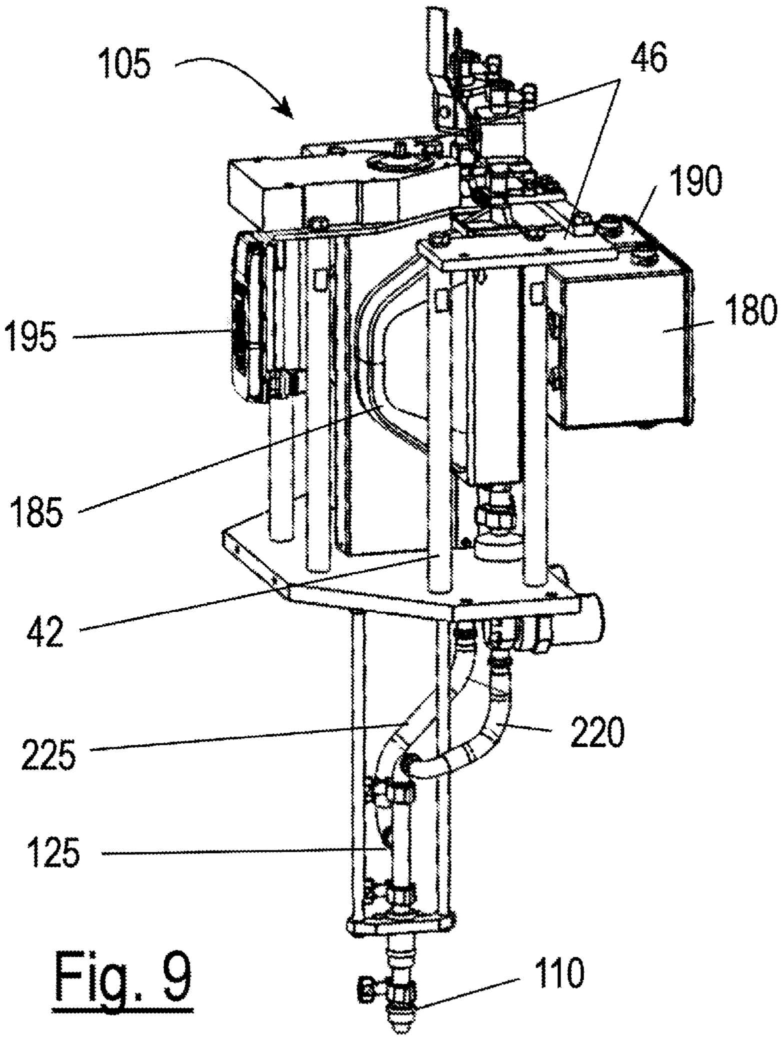
FIG. 9 is a perspective side view of an exemplary filling station.

As can be seen in FIGS. 2-3 and 9, center column portion 140 of the filler assembly is in supporting relation with a lower turret 150 and upper turret 160. Upper turret 160 further includes a filling head support ring 44, and a plurality of spokes 40 and risers 42, in supporting relationship with a plurality of filling stations 105. As illustrated most clearly in FIG. 9, each filling station 105 includes a plurality of filling heads 180, 190 and flowmeters 185, 195. The exemplary filling heads 180, 190 are of the mass flowtype, but may be of any other type that can be accurately controlled by a PLC, using a recipe implemented through software application accessible from operator's station 400. Operator's station 400 may be a self-contained computer, or its components may be physically separated, but in operative communication with each other, such as "dumb" user interface connected via an intranet or wireless means of communication to a remote processor. Other configurations that could easily be adapted to carry out the functions described herein will be known or obvious to those skilled in the art. FIG. 3 further shows support ring 44 in supported relation with center column 140 through spokes 40. Risers 42 (FIG. 9) are in supported connection with support ring 44. A plurality of risers 42 are in supporting connection with each filing head support 46. Supports 46 are in supporting relationship with upper portions of filling heads 180, 190.

Figure 10:
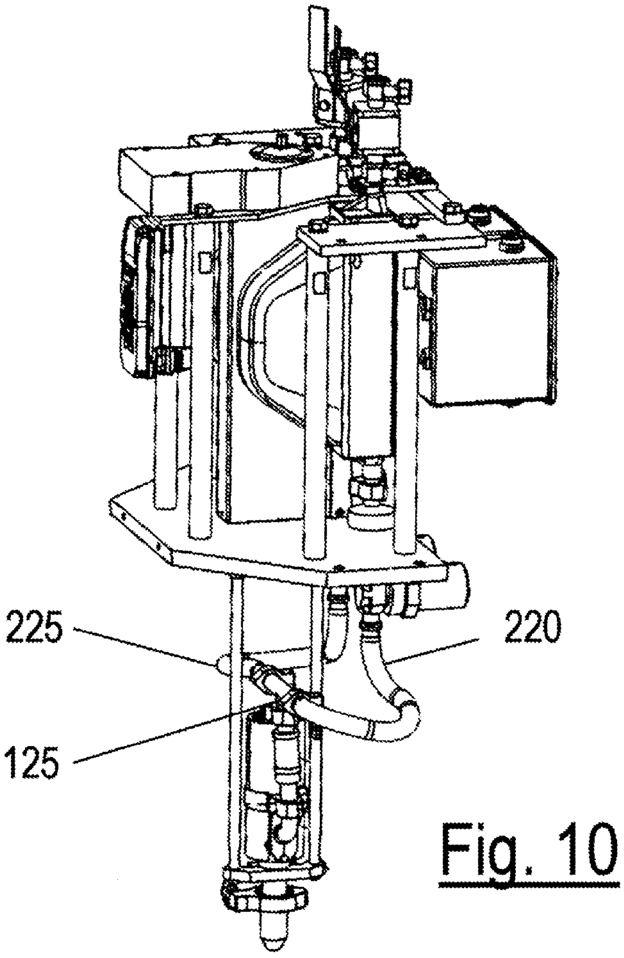
FIG. 10 is a perspective side view of an exemplary filling station having a different exemplary nozzle.

Each filling station will generally include the same number of filling heads 180, 190 as the number of products that are to be introduced into each container. Each filling head 180, 190, is associated with a flowmeter 185, 195, which monitors the quantity of product passing through the filling head. The exemplary filler assembly 10 shown in FIG. 2 includes eighteen filling stations 105; each filling station 105 includes two filling heads 180, 190. Mass flowmeter 185 is in fluid connection with a first lower conduit 220 which is further in is in fluid communication with a nozzle 110. As can be seen in FIG. 9, mass flowmeter 195 is in fluid communication with a second lower conduit 225, which is in fluid communication with first conduit 220 at a point 125 which, in the exemplary embodiment illustrated, is between mass flowmeter 195 and nozzle 110. The filler product from the reservoir 210 which is associated with filling head 190 flows into the first lower conduit 220 carrying filler product from the reservoir 200. Using two filling heads, 180, 190 per container is expressly discussed herein, but if containers are to be filled with more than two products, additional filling heads corresponding to additional component products may also be included. FIG. 10 illustrates a different embodiment in which first and second conduits 220, 225 join directly to one another at point 125, then flow together through the stem of the "T" created into the nozzle below.

Figure 14:
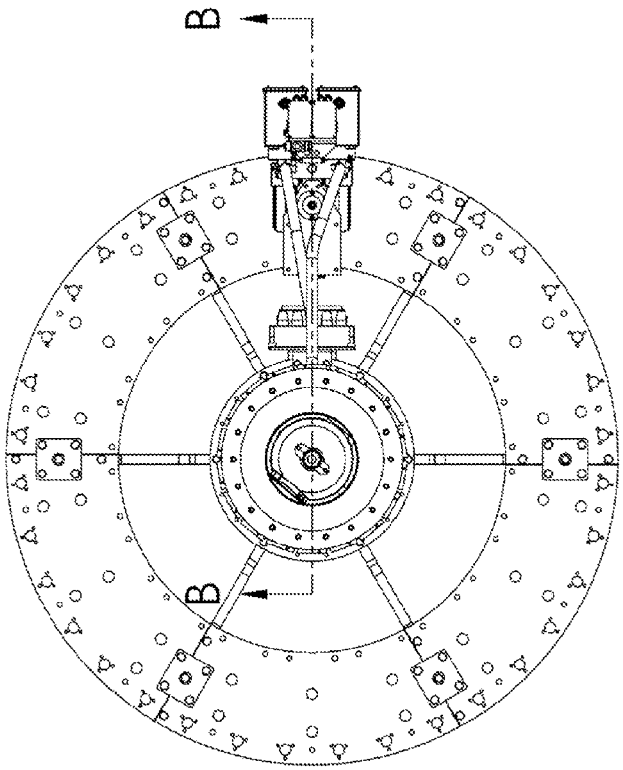
FIG. 14 is a plan view, from above, of the filler assembly shown in FIG. 4.
Figure 15:
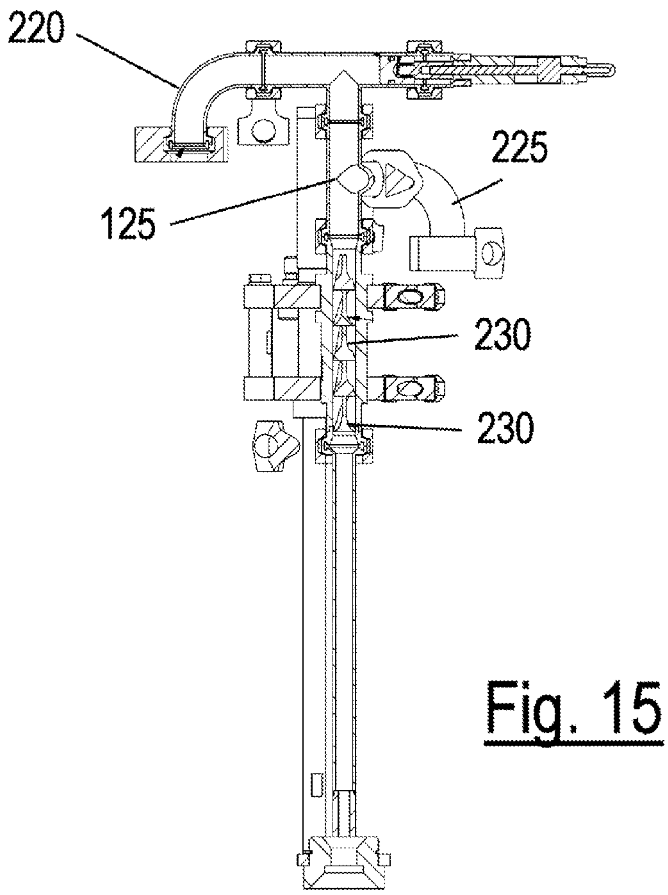
FIG. 15 is a partial cross section of the lower portion of a filling station, including a mixer.

Generally, each first conduit 220 contains at least one mixer 230 within the conduit, said mixer 230 comprising a spiral blade which forces the filler product to flow in a spiral through conduit 220. In the exemplary embodiment illustrated in FIG. 14, the combined products flow through the mixer 230 after point 125. When used in reference to product flow, after means downstream and before means upstream. In other exemplary embodiments, first conduit 220, or second conduit 225 may each or both include a plurality of mixers, and each mixer may be spaced apart from a second mixer having a different relative blade and rotational angle so that the fluid travels a distance between the end of one mixer and the next, or may follow one another without a gap between them.

Figure 4:
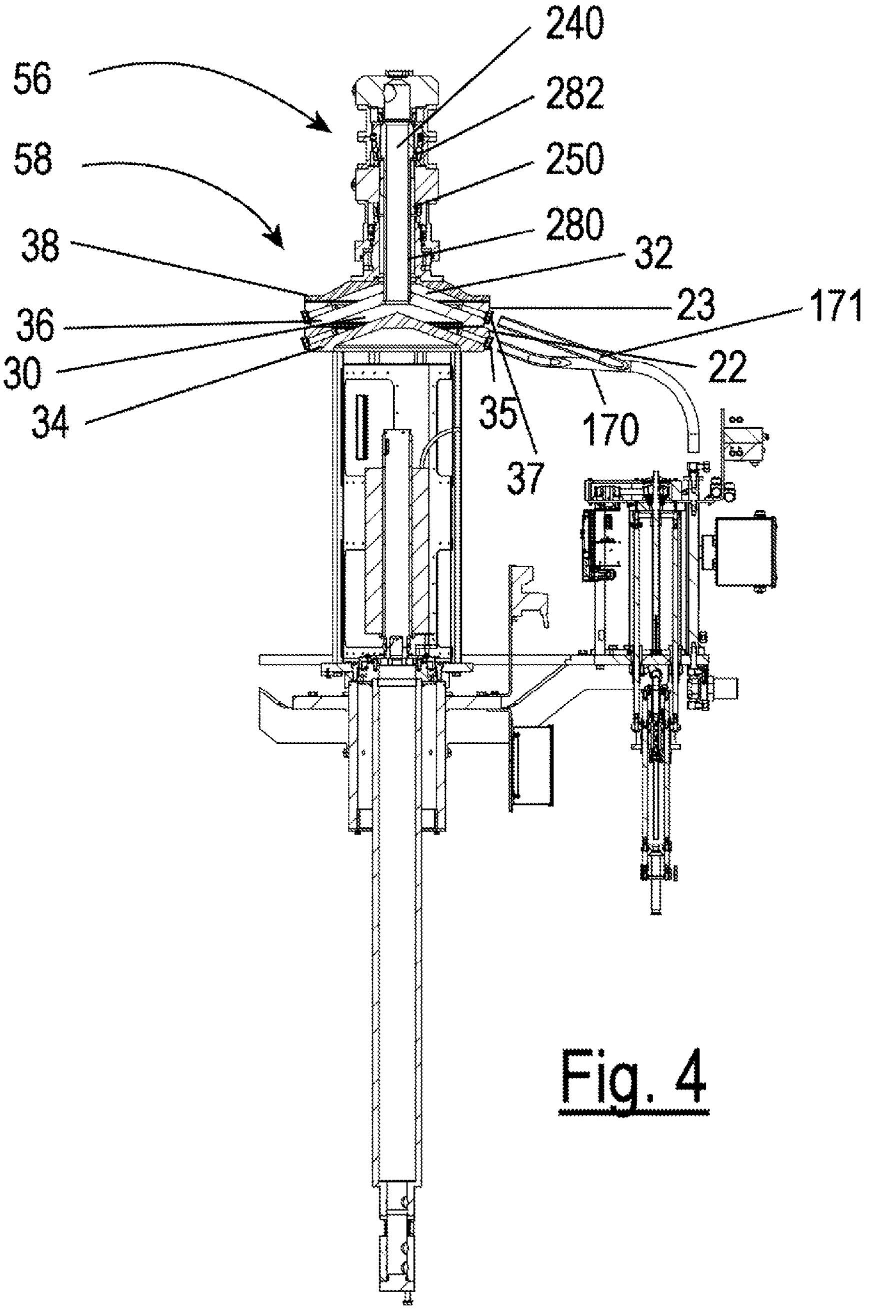
FIG. 4 is a cross section, partly exploded, view of a portion of an exemplary filler assembly with one station installed, including a cross section of the supply manifold.

In the exemplary embodiment shown in FIG. 1 filler product flows from the product reservoirs 200, 210 into the filler assembly 10 through supply lines 120, 130. As can be seen in FIGS. 1 and 4, supply lines 120, 130 are each in fluid communication with a corresponding nested upper chamber 240, 250 within rotary union 56, through respective inlets 260, 270. Upper chambers 120, 130 are bounded within the rotary union 56 by one or more concentric cylindrical walls 280, 282. Rotary union 56 may further include one or more additional nested chambers for the delivery of air to the filler assembly. Focusing now on FIG. 4, filler products pass through upper chambers 240, 250 into supply manifold 58, which rotates relative to the stationary exterior of rotary union 56.

Figure 5:
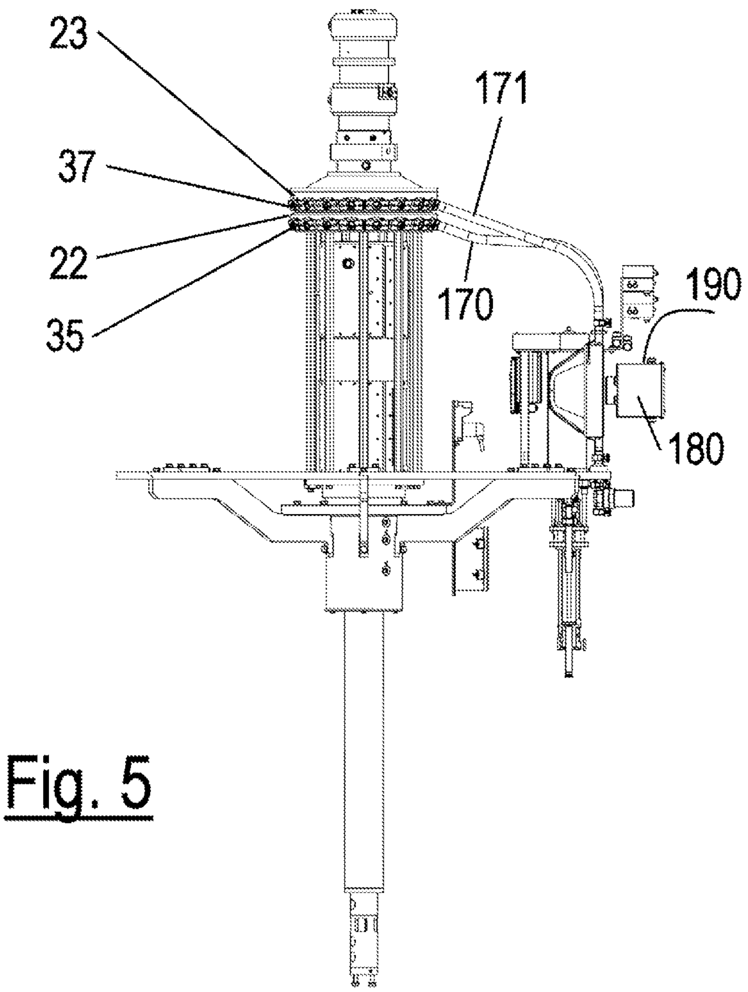
FIG. 5 is a plan view of a portion of an exemplary filler assembly with one station installed.
Figure 6:
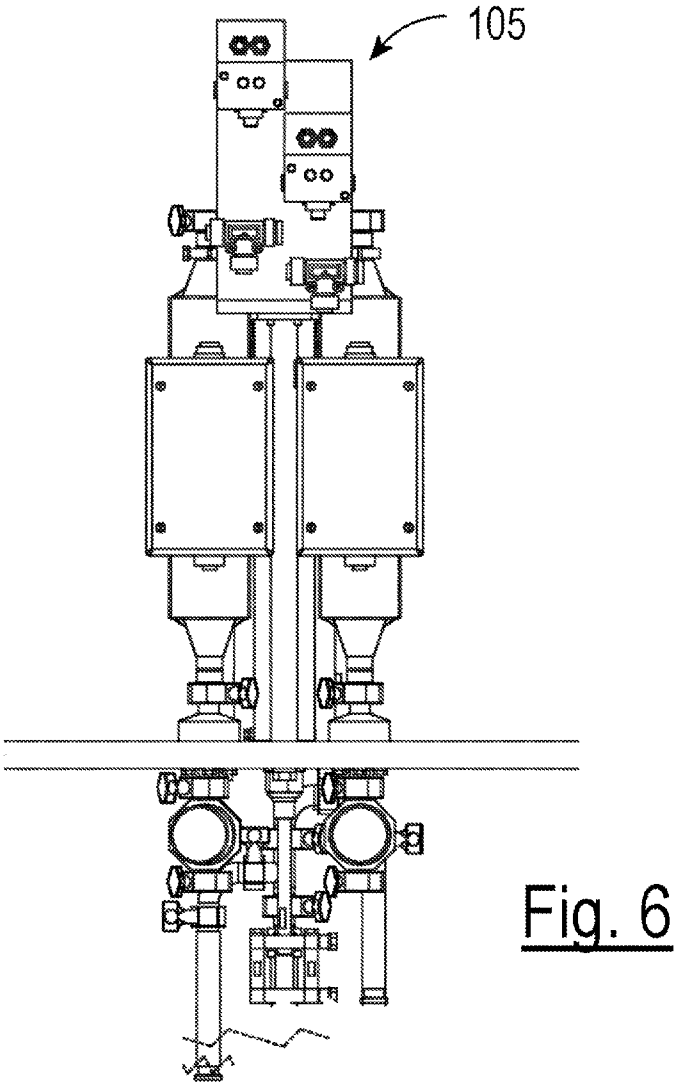
FIG. 6 is an exemplary mass flow dual metered filling station.

Supply manifold 58 generally comprises a plurality of spaced apart conical shells, 34, 36, 38 bounded by outer annular walls 22, 23 which also span the gaps between such shells 34, 36, 38. Supply manifold 58 also includes chambers 30, 32 that are formed between each successive pair of conical shells, 34, 36, 38. In the exemplary embodiment illustrated, manifold chambers 30, 32 are bounded by a lower conical shell 34, an intermediate conical shell 36, an upper conical shell 38, and annular walls 22, 23. The manifold chambers 30, 32 within supply manifold 58 are each in fluid communication, respectively, with an upper chamber 240, 250. The outer annular walls 22, 23 each include a plurality of outlets 35, 37 which are adapted to permit fluid communication between chambers 30, 32 and conduits 170, 171. FIG. 5 is a plan view of upper turret 160 of the exemplary embodiment shown in FIG. 4. In the exemplary embodiment discussed herein, supply manifold 58 generally has the shape described above, which is suitable for use in a rotary filling application using two products. However, it should be understood that supply manifold 58 could be any suitable shape, including being linear, e.g., for use in in-line filling applications.

The manifold chambers 30, 32 of supply manifold 58 are each in fluid communication through conduits 170, 171, respectively, with filling heads 180, 190, respectively. Filling heads 180, 190 are used to introduce the associated product into the bottle or other container through exemplary nozzle 110. Conduits 170, 171, which are hoses in this embodiment, are generally spaced evenly about the supply manifold chambers 30, 32. The term "bottle" and "container" are used interchangeably herein. Any use of the term "bottle" herein is not intended to exclude a container that may not typically be considered a bottle.

Filler product from each product reservoir 200, 210 flows through the product supply system 5 under pressure through the chambers and conduits described above, in fluid and pressure isolation from the filler product from the other product reservoir 210, 200, until the filler product flowing through the conduit from one reservoir 200 flows into a conduit carrying filler product from the other reservoir 210 at point 125, which can be seen in FIG. 9.

Pressure Control

Figure 7:
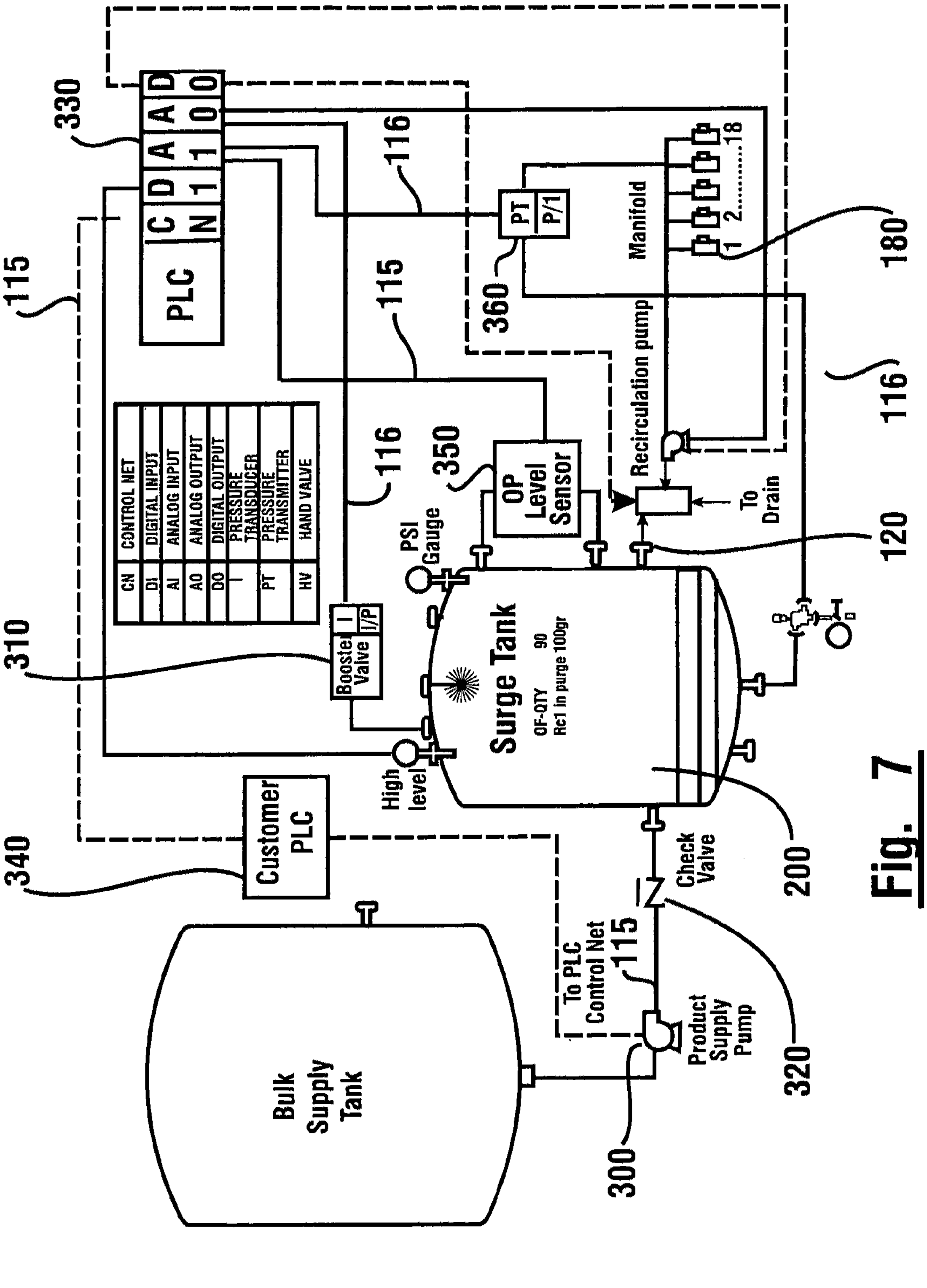
FIG. 7 is a schematic representation of a product pressure control loop.

In order to predictably deliver the quantity of product required, in the time period required, a consistent, relatively precise pressure must be maintained in the filler product manifold. Pressure is controlled by the feedback loop described above. In addition, to maintain product flow, temperature, uniform density, and pressure, a product recirculation loop may be used as illustrated in FIG. 7.

Filler product is initially pressurized in product reservoirs 200, 210. As illustrated schematically in FIG. 7 for a single product reservoir 200, pressure is maintained and adjusted in the product reservoir 200, and throughout the fluid path of the particular filler product supplied by reservoir 200, by two PLC controlled product pressure control loops 115, 116. The system PLC 330 uses input transmitted from a level sensor in a PID (proportional, integral, derivative) loop 115 to direct the customer's PLC 340 to adjust the speed of the product supply pump 300 to keep the level in reservoir 200 constant. The product supply pump 300 moves filler product from the customer's supply of product into product reservoir 200. Similarly, in PID loop 116, the PLC 330 uses input from a pressure sensor 360 located at the supply manifold 58 to direct the booster valve 310 to apply or exhaust air using a pressure transducer. The pressure within the product supply system 5 is isolated from the customer's supply of product by means of a check valve 320. As can be seen in FIG. 7, the product pressure control loops 115, 116 monitor and maintain pressure from the product reservoir 200 through the plurality of filing heads 180 associated with each product reservoir. In the exemplary control loop illustrated, there are 18 such filling heads 180.

Process Overview

Figure 8:
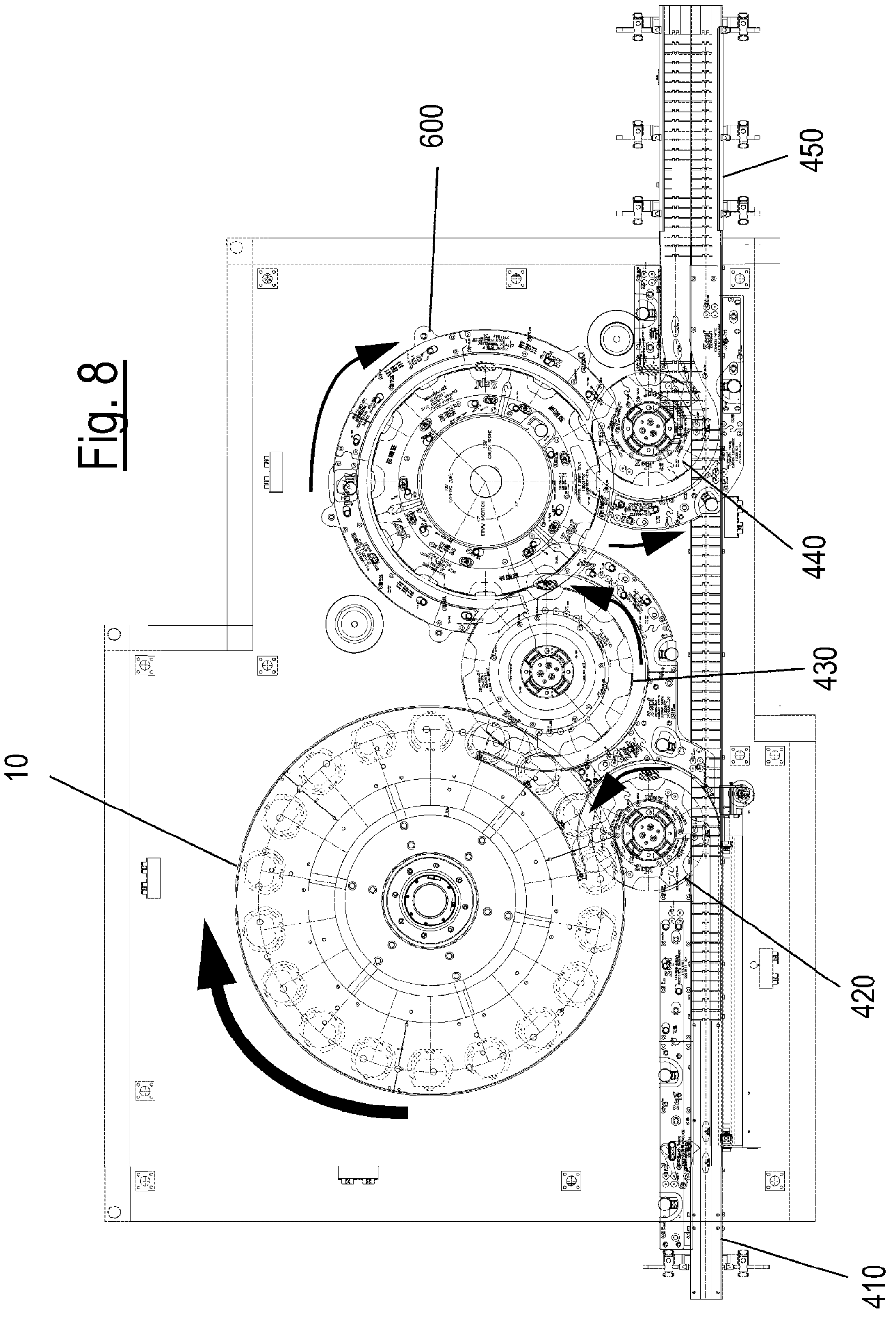
FIG. 8 is a schematic representation of the container flow during filling.

FIG. 8 schematically illustrates the flow of containers in the product supply system 5. Generally, containers to be filled are transported along a conveyer 410. The containers are generally evenly spaced on the conveyer 410 by the use of a rotating helix. As each container approaches the filler apparatus 105, it enters a pocket in an infeed starwheel assembly 420 which rotates the container toward a rotary filler. The infeed starwheel assembly 420 deposits each container onto a container platform on the lower turret 150 of the filler apparatus 105. The neck of each container may be secured by a neck guide, and (depending on the shape of the container), the base of the container or the puck holding the base of the container is secured in a contoured pocket.

Each container moves around the lower turret 150 in position below a filling station 105. Sensors may be included in the filler apparatus 10 which would prevent the filler apparatus 10 from attempting to fill a gap between containers, should one occur in the stream of containers. If a container is present, the PLC 340 controls the execution of the recipe by the apparatus. If a container is present, as it moves around the lower turret 150 in fixed rotational relation to the filling station 105, a nozzle 110 (FIG. 9) extending from the filling head enters the container and fills the container with product in accordance with the recipe being implemented by the PLC 340. In this example, nozzle 110 is a diving nozzle, but in other embodiments, nozzle 110 may be any other nozzle suitable for use with a rotary filler. Two or more fluids products, distinguishable at least by appearance, are deposited in a single non-homogeneous stream into each container as each container moves around the lower turret 150.

The quantity of product delivered by each filling head to each container is monitored by mass flowmeters associated with each filling head. Once the filling heads 180, 190 have delivered net weight of product specified in the active recipe, the PLC instructs a solenoid associated with each filling head to shut it off; in the exemplary embodiment discussed herein this is done by closing the pinch valve. In other embodiments, a different shutoff mechanism may used; in that instance the PLC will activate the shutoff mechanism in accordance with the active recipe and the operation of that particular mechanism. After the filling head is shut off, the flow meter may be directed to initiate an automatic blow down cycle, as generally described in U.S. Pat. Nos. 6,581,654 and 5,161,586.

In addition to controlling the immediate filling of a particular container, the PLC 330 reports data representative of quantity and other characteristics of each product delivered by each filling head over a plurality of bottles and reports it to the software application which is accessible from the operator station 400. This information may be displayed or used by the application as described below. In addition, the application compares the actual product delivered to the target weight to generate secondary data, including a compensation factor which may be used to adjust the operation of the flowmeter to more accurately deliver quantity of the product specified in the recipe.

The compensation factor is the average actual weight delivered to a plurality of containers by a particular filling head less the target weight designated in the recipe. If the delivered weights associated with individual filling heads 180, 190 are outside the acceptable fill limits established by the customer, the problem can be addressed by applying individual compensation for a particular filling head to bring the actual fill weight within the desired limits, as discussed below in connection with FIG. 24. If the average fill weights are within the acceptable limits, the global compensation can be applied to all filling heads to optimize the performance by minimizing product waste, as discussed below in connection with FIG. 11.

After being filled in accordance with the active recipe, the filled containers leave the filler platform as illustrated in the container flow schematic in FIG. 8 to the transfer starwheel assembly 430 which carries them in counterclockwise rotation to the capper 600, where they are secured between the turret starwheel and rear guide for the capping operation. Once capped, they move to a discharge starwheel assembly 440 which moves them counterclockwise rotation onto the discharge conveyer 450. Exemplary capping processes and apparatuses which are suitable for use in this product supply system are described in whole or in part in U.S. Pat. Nos. 4,932,824 and 5,063,725, which are incorporated herein by reference.

Exemplary Recipe Implementation

The PLC 330 is programmed to direct the PLC to implement a particular recipe. The recipe may be customized to fill the containers to create a particular appearance and/or product composition. A recipe designates values and settings which control variable characteristics of the fill such as target fill weight for each product individually and for the container as a whole, the start or stop of time of each of the component product relative to the other, the depth of the diving nozzle, the manufacturer's tolerance for overfill or underfill measured individually by product component and by combined product for the container, the direction of rotation of the platform holding the container, the speed of rotation of the container platform, or the angle rotated through in a predetermined time period by the platform, and the number of fill regions. The values and settings for variable characteristics may be provided by data representative of such characteristics as discussed in more detail with respect to exemplary recipes.

Figure 11:
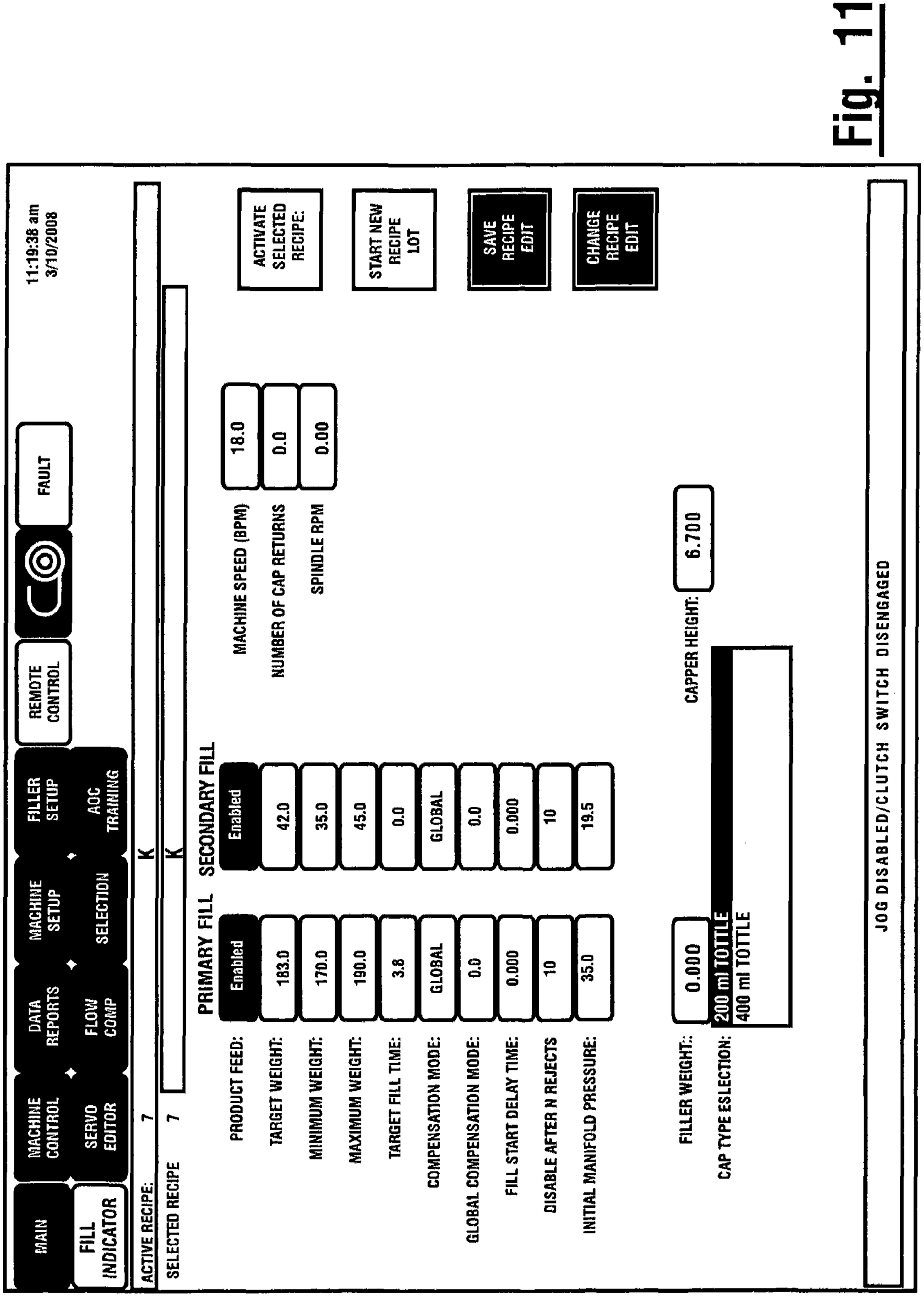
FIG. 11 is an exemplary first recipe screen.
Figure 12:
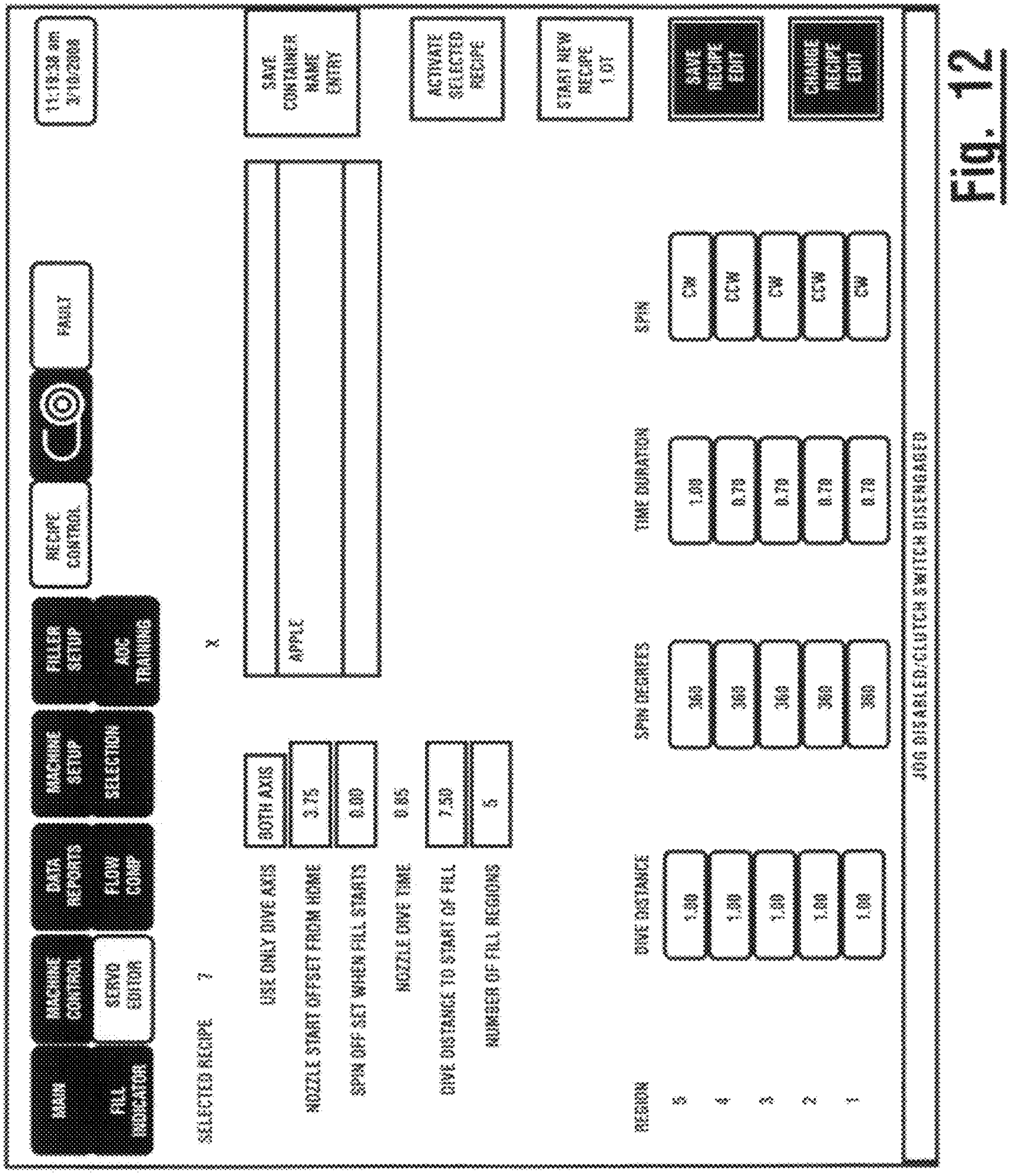
FIG. 12 is an exemplary second recipe screen.
Figure 13:
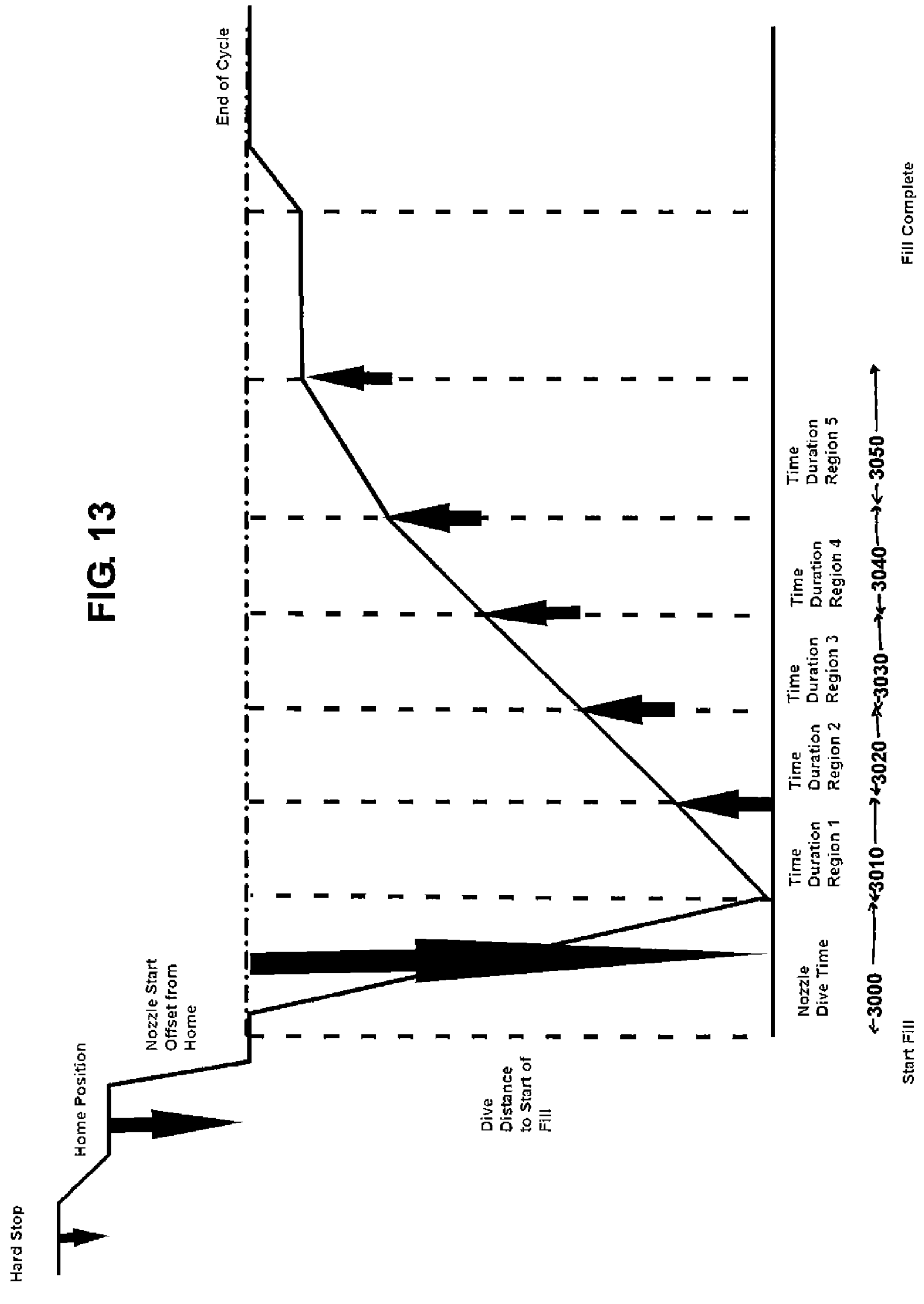
FIG. 13 is a graphic illustration of the operation of a filling station implementing a recipe with five fill regions.

FIG. 13 conceptually illustrates the region based filling process and FIGS. 11 and 12 illustrate a typical recipe. FIG. 11 is the portion of the recipe that determines the ratio of one product to the other, the total quantity of product, the time to fill, the rate of fill, the permitted overfill, and the initial pressures in the product reservoirs, and includes data representative of such characteristics, which the application uses to cause one or more controllers to operate the mechanical components of the system to act in the manner dictated by such data. Generally a container will be filled with a larger quantity of one product than the other. The greater quantity product is typically designated the primary fill, with the remaining product designated the secondary fill. In the recipe shown in FIG. 11, the recipe requires adding between 170 and 190 grams of a first product and between 35 and 45 grams of a second product to a container, with the goal of 183 grams of a first product and 42 grams of a second product. Each container should take 3.8 seconds to fill, with the overall goal of filling 180 bottles per minute. The programming of the PLC is adapted to prevent entering impossible fill rates or times in a recipe. The initial pressure in the manifold delivering the primary product is 35 PSI, and the initial pressure in the manifold delivering the secondary product is 19.5 PSI.

In some instances, it may be desirable to begin the flow of one product before the other, or to continue the flow of one product after the other. These can be set using the "Fill Start Delay" and the "Target Fill time." In the recipe illustrated, both products start and end at the same time, since no delay is specified for either the primary or secondary fill.

In order to produce a uniform product, it is necessary to monitor how consistently each filling station 105 fills containers, and to adjust for any disparity between filling stations or to adjust all the operation of all filling heads to ensure minimal product waste. If it becomes apparent that a particular filling station 105 cannot achieve the filling goals consistently, it can be disabled temporarily in order to permit the filling operation to continue until some later time at which the problem can be identified and resolved. In this instance, the failure to fill 10 consecutive containers properly will cause the PLC 330 to disable the particular filling station 105.

In addition to the overall quantities and ratio of filler products set out in the first recipe screen, the way the product is injected into the container is governed by a second portion of the recipe, via a second recipe screen. An example of a second recipe screen is illustrated in FIG. 12. In the recipe illustrated, the container is divided into five fill regions. For each region, the depth of the region and the container spin are controllable. To control both "both axis" would be selected in the recipe, as is shown. To control only the depth of the nozzle only, and not the rotation, that option would be selected. Region 1 corresponds to the bottom of the container and Region 5 corresponds to the top. FIG. 13 graphically illustrates the filling of the different regions under the control of a recipe.

When the exemplary recipe in FIG. 12 is implemented, the nozzle dives into the container to a depth of 7.5 inches. This corresponds to region 3000 in FIG. 13. Once it reaches the initial dive depth, the filling process begins. The delivery of each product component is governed by the active recipe implemented by the PLC 330, which starts the flow of both products simultaneously or sequentially as directed by the delay set out in the recipe. Under the control of the exemplary recipe, as product is delivered the nozzle 110 withdraws at a rate of 1 inch in 0.7 seconds. Simultaneously, the container is rotated clockwise about a vertical axis at a rate of 360 degrees in 0.7 seconds. The axis of rotation generally corresponds to a vertical line passing through the center of the nozzle, and unless distinguished may be referred to as a nozzle axis, dive axis, or platform axis. This corresponds to region 3010 in FIG. 13. The second, third, and fourth regions require the same withdrawal rate and spin rate, reversing direction of the spin in each region, so the container would spin counterclockwise, clockwise, and counterclockwise, respectively. These correspond to regions 3020, 3030, and 3040 in FIG. 13. The fifth region slows the rate of withdrawal to 1 inch in 1 second and a rotation rate of 360 degrees clockwise in 1 second. This corresponds to region 3050 in FIG. 13.

The operator can influence the appearance of the product in the resulting container considerably by modifying the portions of the recipe controlling the dive and spin actions. A recipe which designates a single region, without spinning the container, would produce a far different appearance than a recipe which designates 5 regions, with the container spin reversing in each region, for example. Similarly, a recipe designating a delay in the introduction of one product to the container will create a different appearance when viewed from the bottom of the container than one in which both products began to flow simultaneously. Reversing spin periodically during the filling process would tend to produce a different appearance than using the same spin in all regions of the container.

The appearance of the product in the container also depends on the product ratio, a characteristic which can also be varied by the modifying the active recipe.

Using the application accessible from the operators station 4010 discussed herein, the operator may implement a recipe which creates the desired appearance for one product, and use the same application to design and/or implement a recipe to create an entirely different appearance in a different lot of containers without having to make mechanical modifications or load a different software application. Similarly, if a previously used recipe creates an appearance that is close to the desired appearance, the operator may copy the original recipe and modify it slightly as needed to create an improved appearance without destroying the previous recipe.

In addition to the above easily variable characteristics, the appearance and product composition of the filled containers is also impacted by relatively fixed parameters, including the mixers 230, if any, which are used in the filling process.

Monitoring, Data, and Quality Control

As previously discussed, the exemplary product supply system 5 comprises a rotary filler apparatus 10 which is adapted as described herein to deliver a plurality of products which differ from each other at least in appearance to a single container. The exemplary features include the physical features described above, as well as at least one PLC 330 and an operator station 400 and an associated software application which is programmed to control the operation of the physical features of the system through the PLC 330.

In addition to using one or more PLCs to implement a particular recipe, the operator's station 400 provides easy access to control the operation of the product supply system 5, and the associated application is programmed to receive and display operational and statistical information in a form which can be used by the operator to optimize the filling performance and to minimize the loss of time and products and to predictably reproduce a desired product ratio or appearance in the filled containers.

The tabbed menus and controls screens in one exemplary embodiment of an operator station 400 application are illustrated in FIG. 16. The six blocks in the first column 500 of FIG. 16 are visible as tabs on the main menu shown in exemplary fashion in FIG. 17. Selecting one of these tabs creates a second row of tabs below the first, comprising screens or sub-menus in the adjacent second column 510 of FIG. 16. Similarly, selecting one of the tabs in the second column 510 creates a third row of tabs comprising screens or sub-menus in the adjacent third column 520 of FIG. 16. As shown in exemplary fashion in FIG. 18, the full range of sub-menus or screens in the same tier as the screen or sub-menu, and every menu above that tier, are accessible from the current screen.

Figure 17:
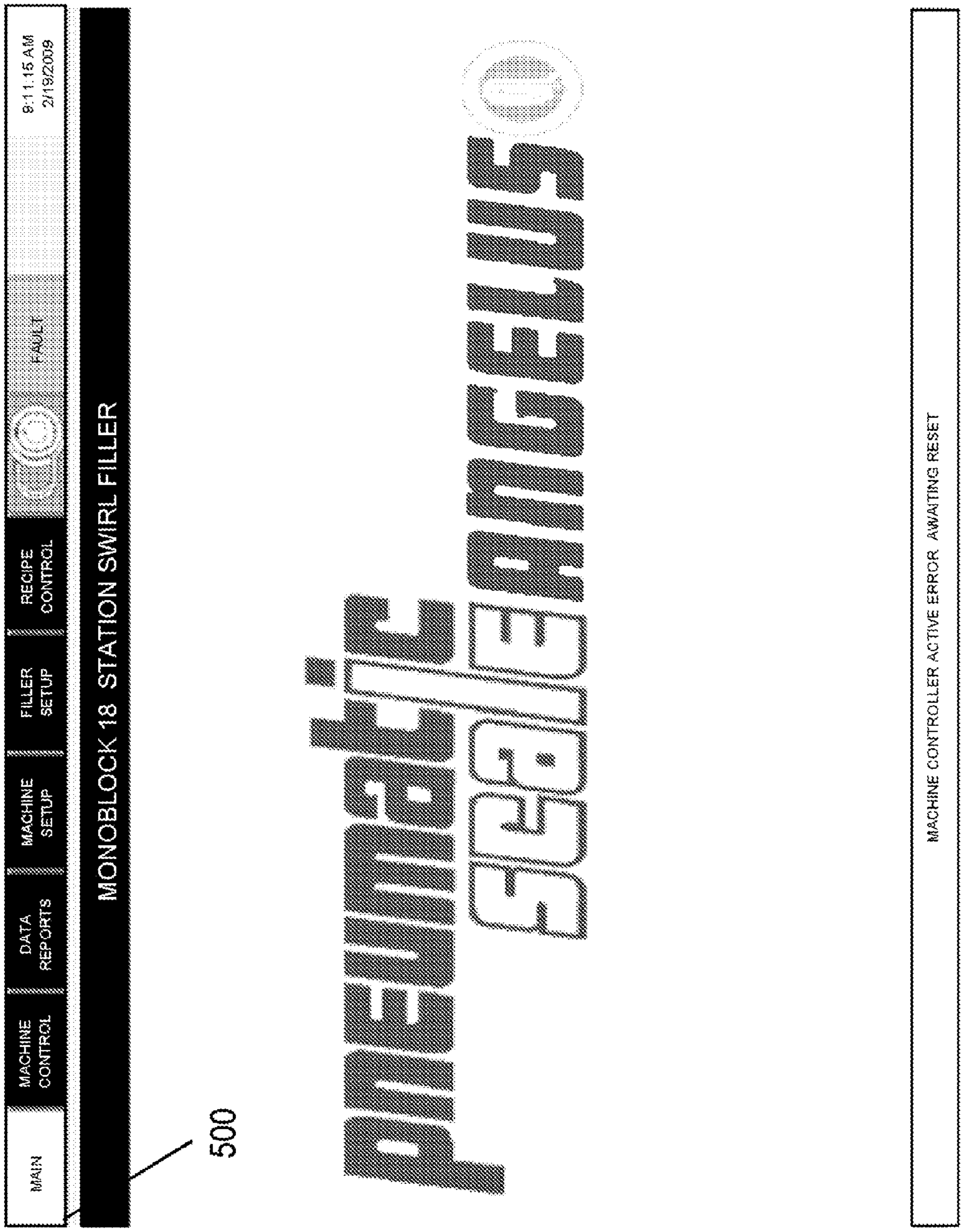
FIG. 17 is an exemplary main screen of an exemplary program associated with the product supply system of FIG. 1.

A main screen of the operator station 400, illustrated in exemplary fashion in FIG. 17, includes a plurality of tabbed menus which permit the operator to choose a subgroup of functions or information to access. The exemplary main menu screen in FIG. 17 includes a row of tabs 500 for menu pages related to machine control, data and reports, machine setup, filler setup, recipe control and system faults. Each menu tab generally provides access to a related set of submenus 510, 520. In addition to menus, one or more message bars may be included which are visible from all or many of the menus, sub-menus, or screen which provide important information the operator may need to know regardless of what particular menu, sub-menu, or screen he or she is currently working with. The recipe bar(s) 530 just below the menu tabs, and the message bar 540 at the bottom of the screen, are two examples of this feature. This important information may include such things as the current recipe being implemented (active recipe), the current operation being performed, errors that have occurred, or features of the product filler system that are currently disabled. The tabbed menus and control or report screens accessible therefrom, which are illustrated and discussed herein are exemplary not limiting. Some exemplary menus, sub-menus, and screens that are relevant to dual product filling as opposed to general rotary filling are discussed more fully below.

Figure 19:
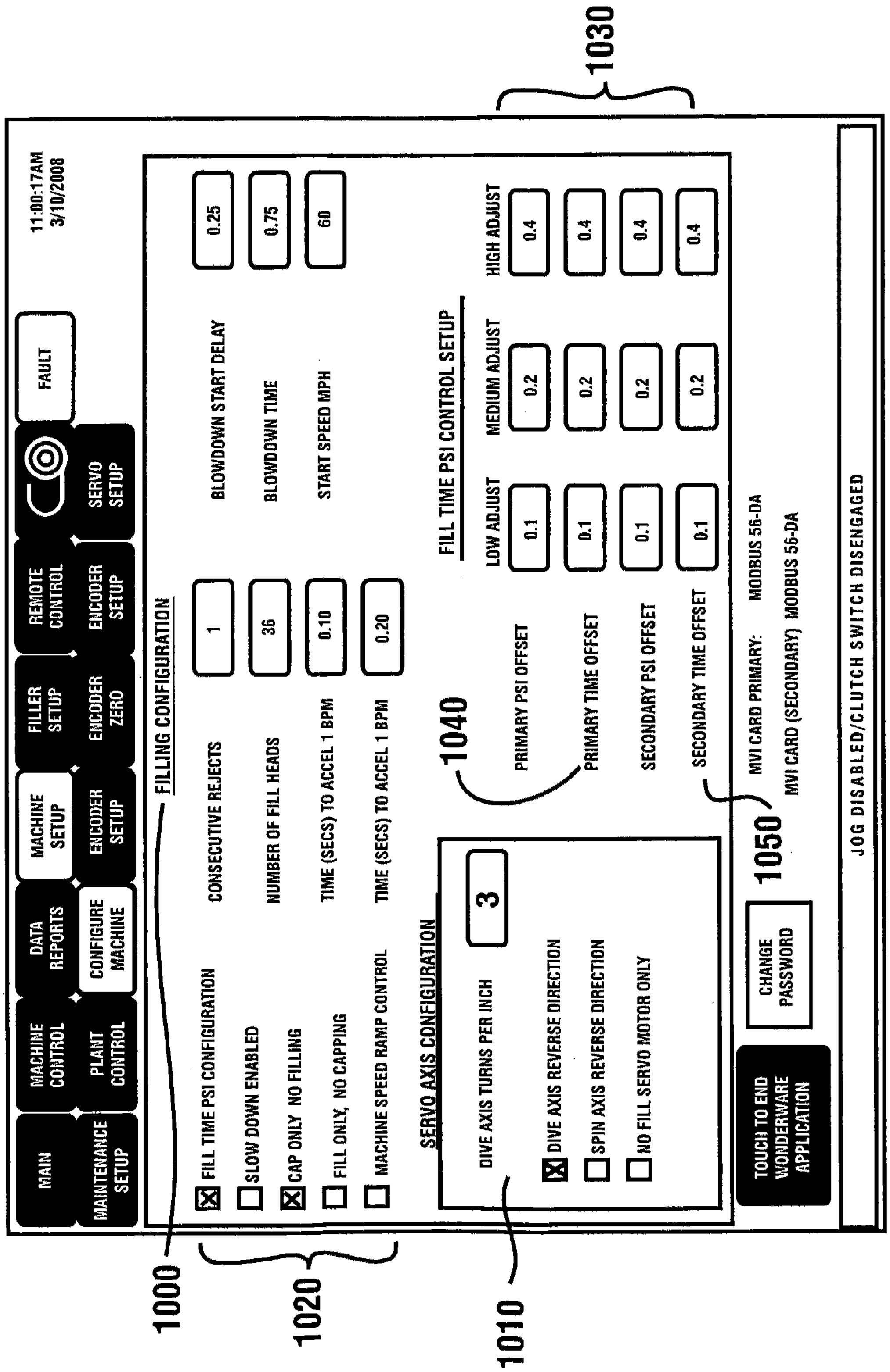
FIG. 19 is an exemplary Machine Setup-Configure Machine screen of an exemplary program associated with the product supply system of FIG. 1.
Figure 20:
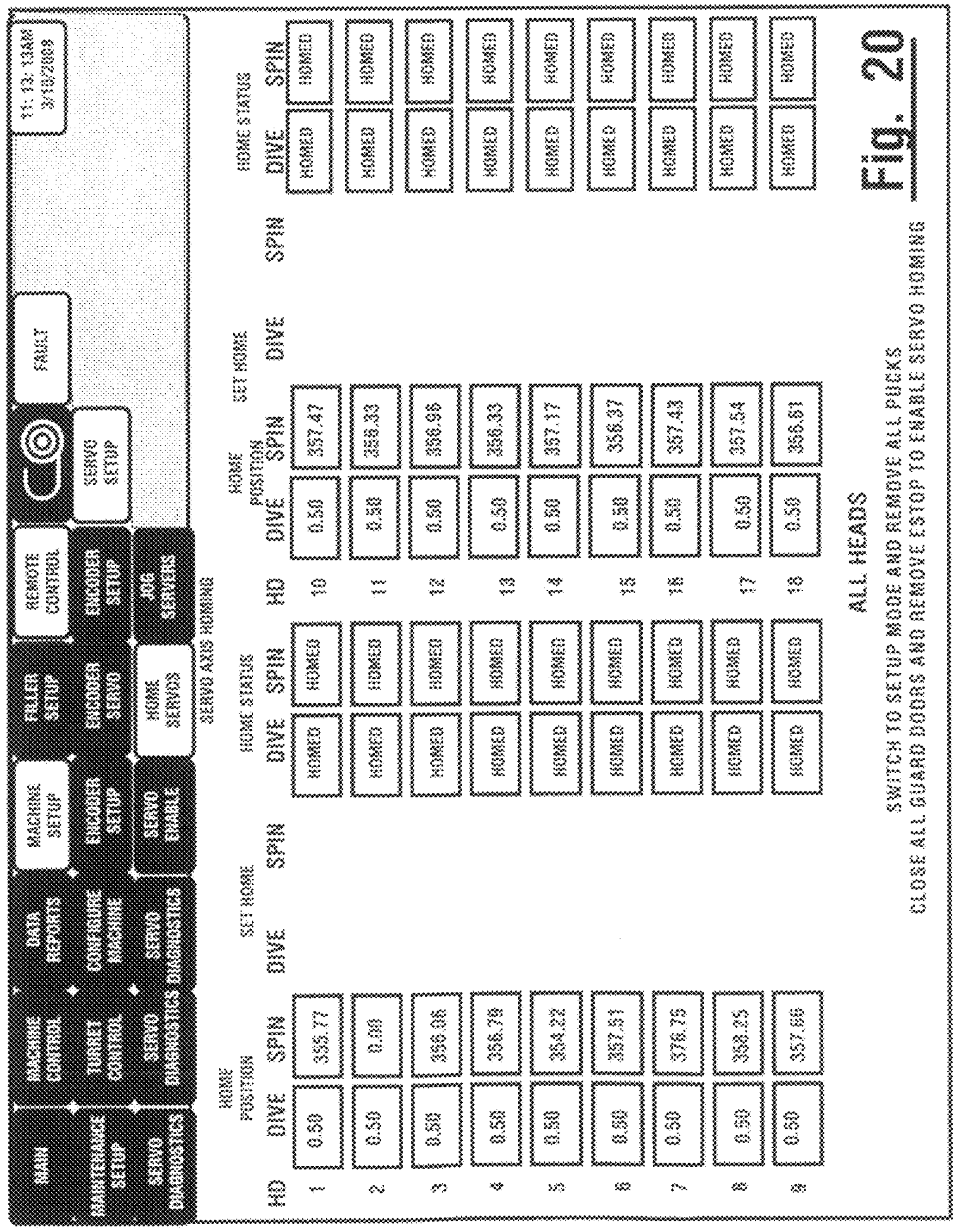
FIG. 20 is an exemplary Machine Setup-Servo Setup-Home Servos screen of an exemplary program associated with the product supply system of FIG. 1.

A number of the menus, sub-menus, or screens permit the operator to control the various aspects of the product supply system 5. In the exemplary embodiment discussed herein, FIGS. 19-22 illustrate exemplary screens that may be used by the operator to control how the product supply system 5 functions, in general. The exemplary screens illustrated in FIGS. 11-12, and 23-24 provide access to create recipes and control how the product supply system 5 fills a particular container filling job in which a specific product quantity, ratio of component products, and appearance is desired. FIG. 19 allows the operator to enable various filling options 1020, set the general filling configuration parameters 1000, define the spin of the containers 1010, and set the parameters used to adjust the pressure control feedback loop 1030.

Through the exemplary screen shown in FIG. 19, the operator may dictate whether one or both of capping and filling will be carried out and whether the flowmeter is to initiate a blow-down operation at the end of each container fill. The operator may also set automated adjustments of the pressure control loop to maintain the proper pressure. Filling parameters that the operator is able to set may include: the number of filling heads, the number of rejects before the machine stops, and (if enabled) the ramp up and ramp down timing and blow down parameters.

Through the exemplary screen in FIG. 19, the operator may also set global parameters to control the dive nozzle, including how many turns of the feed screw are required to move the dive axis one inch, and the direction of the spin axis. The dive axis, and the axis of rotation of the container platform are typically the same axis. Individual parameters for each filling head that are not related to a particular recipe (global parameters) may be set through a different sub-menu, illustrated in FIG. 20.

Returning to FIG. 19, fill time PSI control may be enabled to automatically keep the pressure within the system properly adjusted. If it is enabled, the operator may set parameters so that adjustments are made to the primary pressure for each product line (one from product reservoir 200 and one from product reservoir 210, in the exemplary embodiment) to ensure that the fill times remain relatively constant. For each of the product supply lines, the operator may specify the average fill time variance that the PLC should use to trigger an adjustment to the system PSI. For each product line, the operator may specify three average fill time variances (time offset) corresponding to specified low, medium, or high pressure adjustments. If the average fill time, over the designated number of fills per filling head in a given product line, varies by more than the specified time offset, the PLC is directed to make an adjustment to the target pressure in the designated respective amount (low, medium, or high) to bring the fill times closer to the target times. In this exemplary embodiment, the average fill time used to trigger an adjustment is an average of the fill times over three cycles of the rotary filler. In other embodiments the average fill time may be based on fewer or more cycles.

Figure 21:
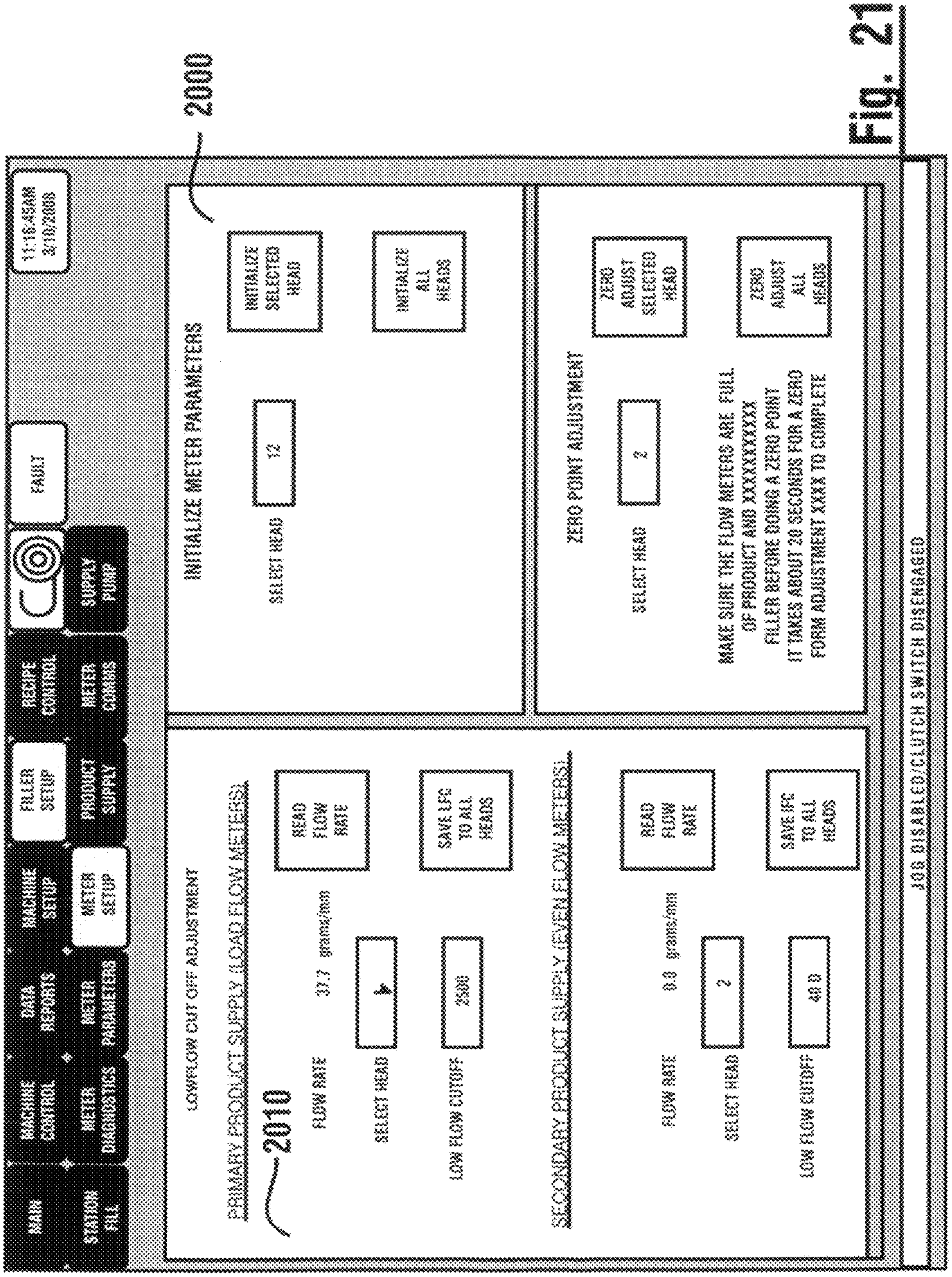
FIG. 21 is an exemplary Filler Setup-Meter Setup screen of an exemplary program associated with the product supply system of FIG. 1.
Figure 22:
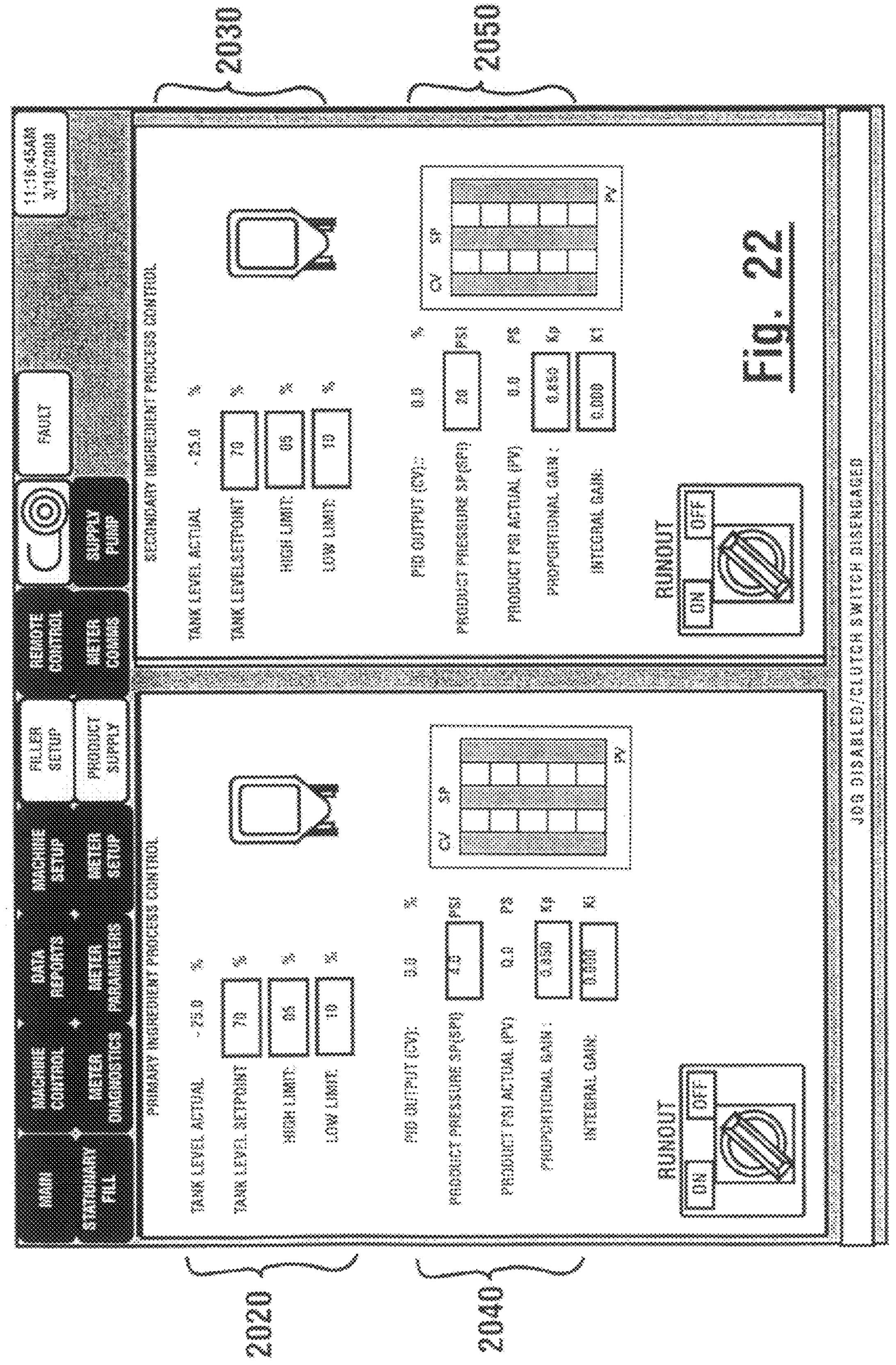
FIG. 22 is an exemplary Filler Setup-Product Supply screen of an exemplary program associated with the product supply system of FIG. 1.

Additional general parameters for the system may be set using the screens in FIGS. 21 and 22. The exemplary screen shown in FIG. 21 may be used to initialize the parameters for each flowmeter 2000, as well as to set a flow rate below which the flowmeter will no longer measure the flow through it 2010. The exemplary screen shown in FIG. 22 may be used to control or monitor the product reservoir levels 2020, 2030 and the PID loops controlling the pressure in the product line 2040, 2050.

In addition to setting global operating parameters, the operator can use a user interface on operator's station to create, edit, or implement a particular recipe. Each recipe is a set of parameters to be used by the PLC to control how the product supply system 5 and filler apparatus fills the containers. The main exemplary recipe screens were previously discussed, and are shown in FIGS. 11 and 12. Each of these figures represents an interface screen that may be used to create or edit a portion of a recipe which the product filler system implements to fill containers having specific individual and combined product fill weights and appearance. The individual parameters that comprise a recipe, and how those parameters impact the filling process, were discussed in detail above.

Figure 23:
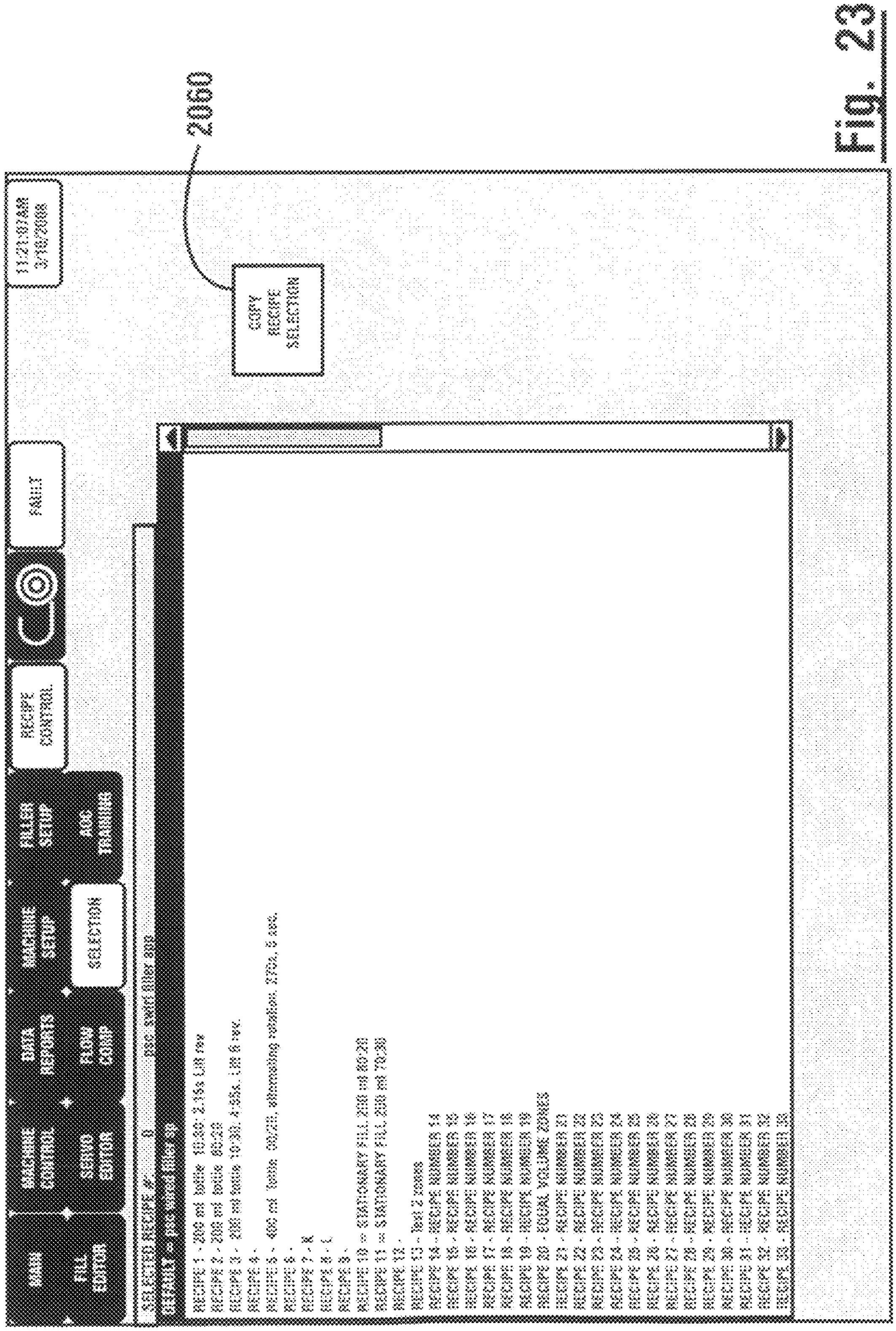
FIG. 23 is an exemplary Recipe Control-Selection screen of an exemplary program associated with the product supply system of FIG. 1.
Figure 24:
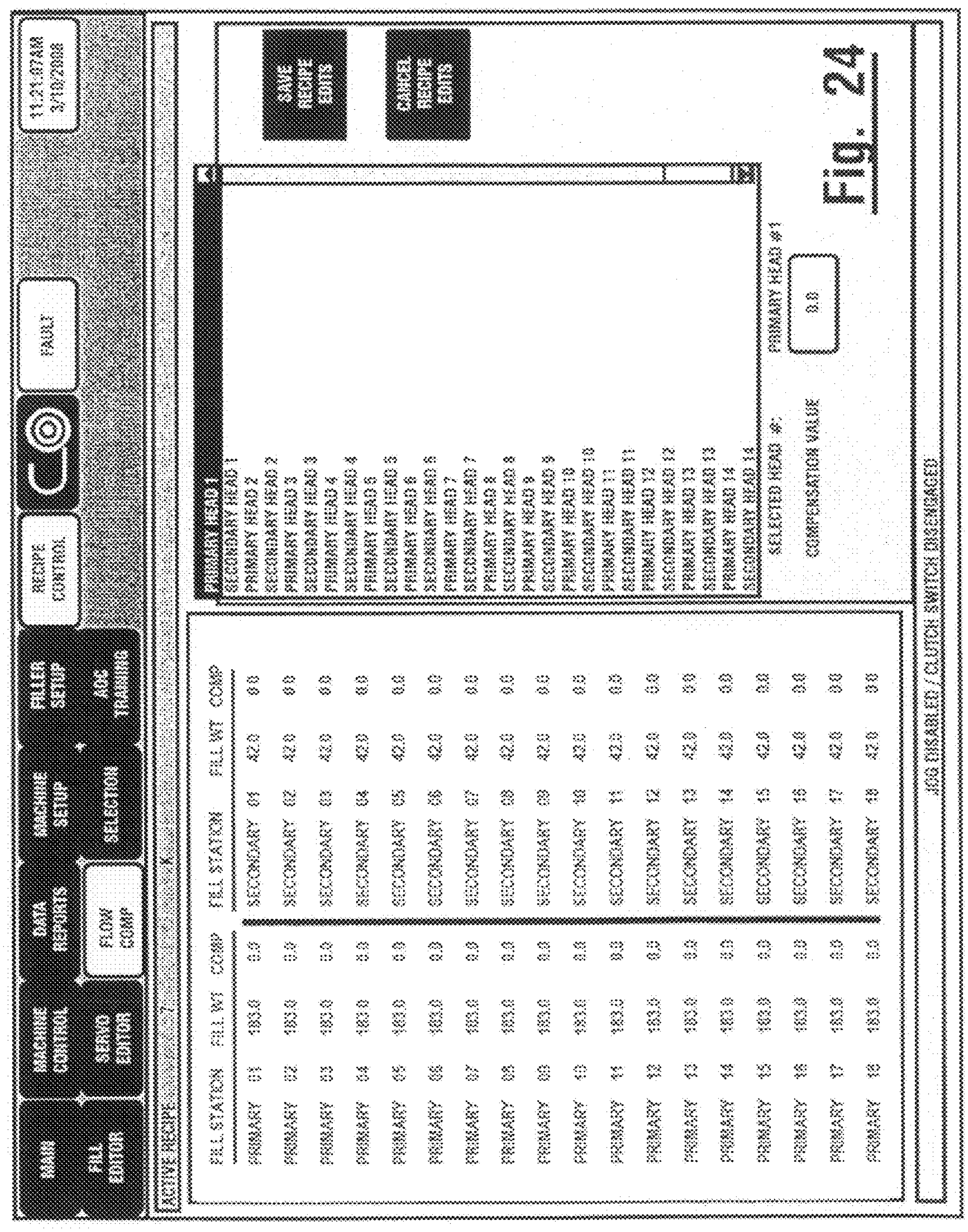
FIG. 24 is an exemplary Recipe Control-Flow Compensation screen of an exemplary program associated with the product supply system of FIG. 1.

In addition to directly editing a recipe through the interface screens shown in FIGS. 11 and 12, the recipes may be further modified using screens shown in FIGS. 23 and 24. The exemplary screen in FIG. 24 provides the operator with a way to a way to adjust the individual compensation values to optimize the fill in each container without wasting product. This screen may be used after reviewing the fill data in available in screens such as the one shown in FIG. 27. If the filling process, on the whole, is performing within specified fill tolerances, but individual filling heads are not performing within tolerance, the operator may make compensation adjustments to individual filling heads by selecting the individual compensation mode through the exemplary interface screen illustrated in FIG. 11. Once selected, the operator may use the exemplary screen in FIG. 24, to review the current fill weight and compensation values. The operator may also select the filling head which is not performing within tolerance using the scroll bar, and adjust the compensation value as needed to bring it within the tolerance specified in the recipe.

On the other hand, if the product supply system 5 as a whole is not filling within the specified tolerances, the operator may apply a global compensation factor to all filling heads by selecting the global compensation mode and setting the appropriate value to bring the average performance within the specified tolerance levels using the exemplary interface screen in FIG. 11.

In addition to adjusting the performance of a particular recipe, the operator may want to create a similar recipe without starting from scratch. The exemplary screen shown in FIG. 23 provides the operator with access to each of the existing recipes, by recipe number or name, and permits the operator to copy any selected recipe to use as a base recipe for creating subsequent recipes. This is done by selecting and copying a recipe close to the desired new recipe using the scroll bar and "Copy Recipe Selection" button 2060.

In order to assist the operator in determining whether the product supply system 5 is performing as intended, the application in the operator's station also provides the operator with a number of system information and data reporting tools through which to evaluate the performance. The exemplary screens shown in FIGS. 32-34 and 38 include general information about the operation of the product supply system 5, and about the active recipe. Exemplary screens showing some of the various presentations of the direct and secondary data available to the operator are included in FIGS. 18, 26-28, 30, and 37.

Figure 36:
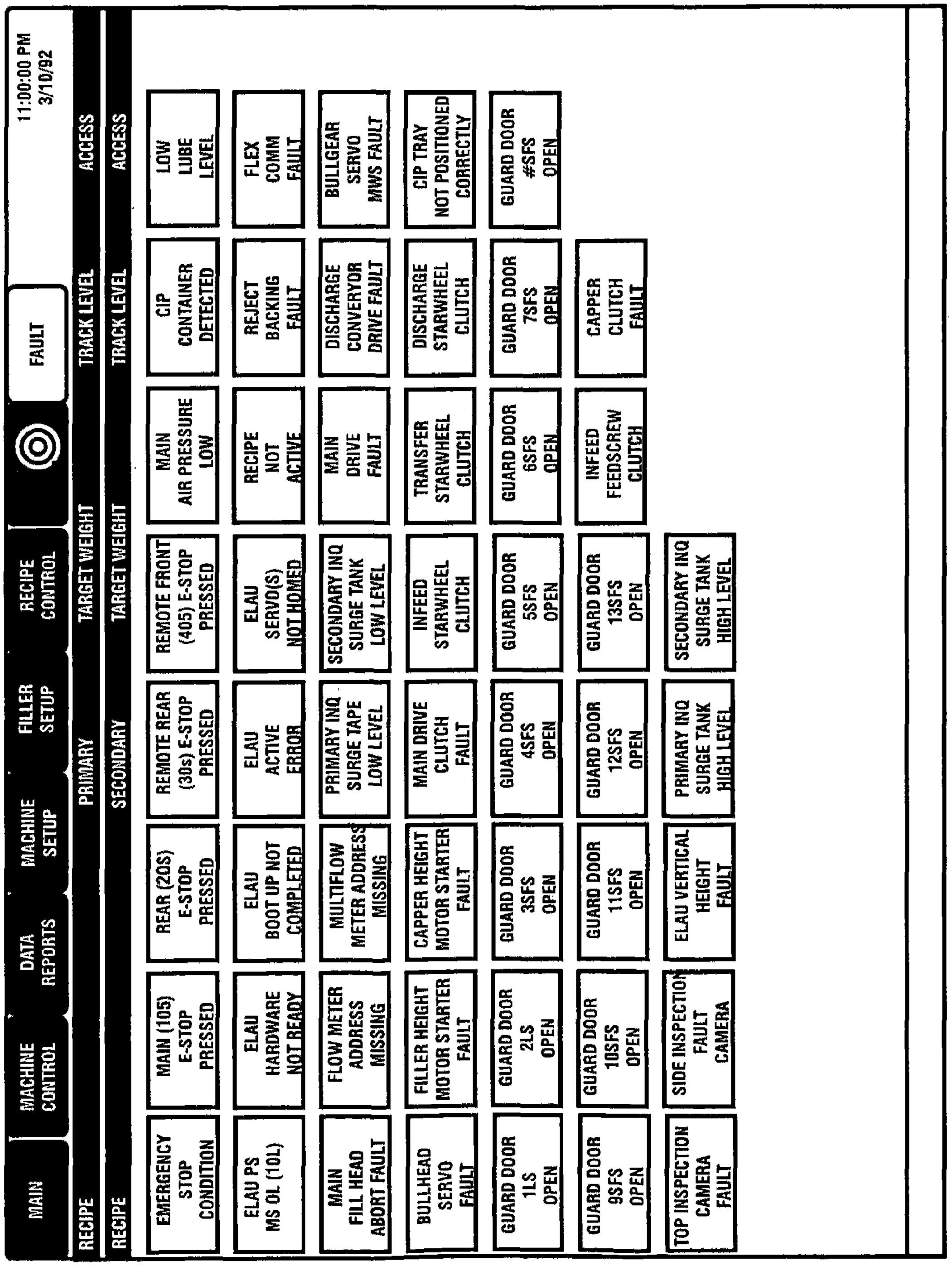
FIG. 36 is an exemplary Fault screen of an exemplary program associated with the product supply system of FIG. 1.
Figure 38:
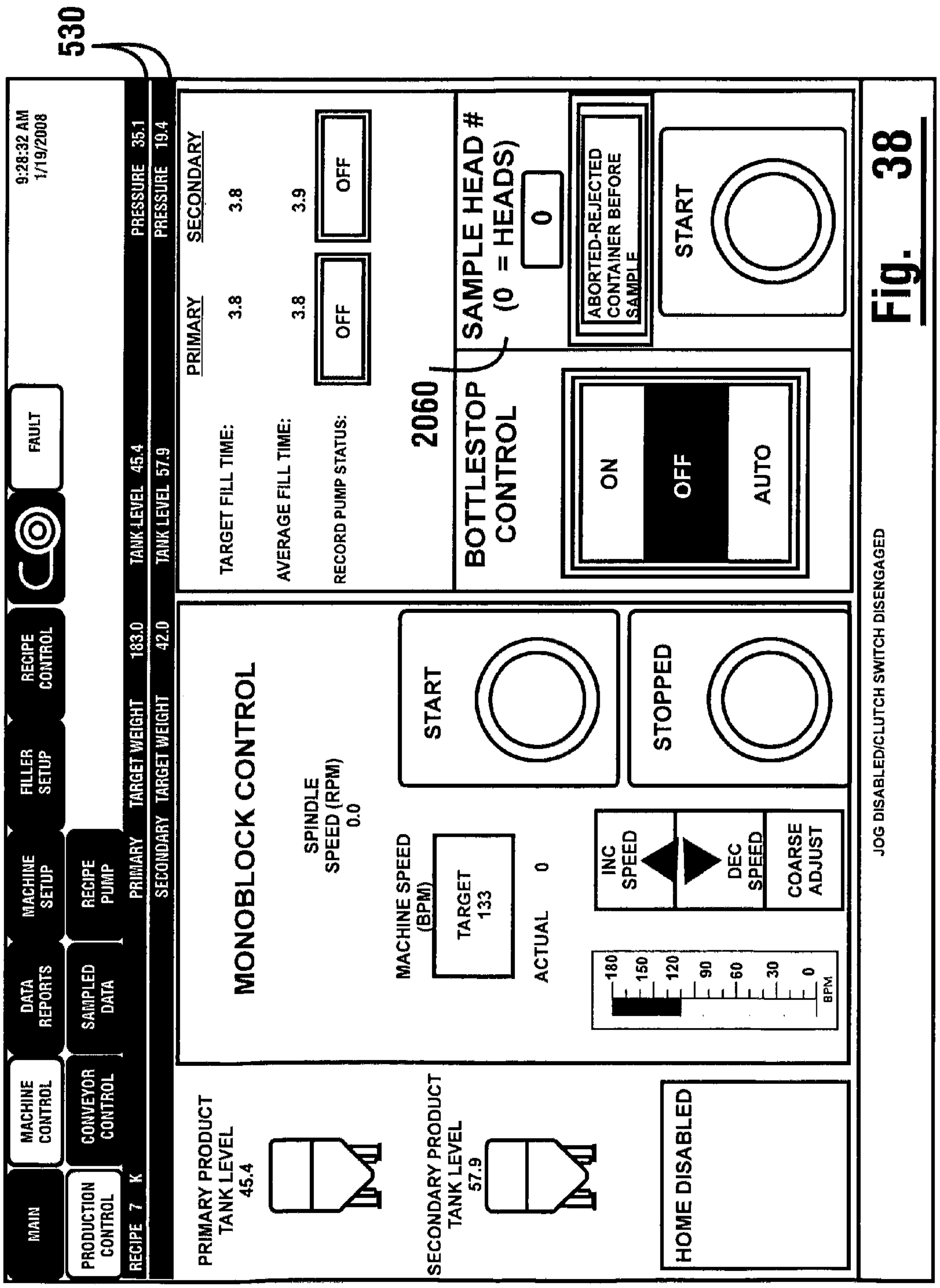
FIG. 38 is an exemplary Machine Control-Production Control screen of an exemplary program associated with the product supply system of FIG. 1.

The exemplary screen shown in FIG. 38 provides a snapshot of some of the main features and settings of the product supply system. Recipe bars 530 indicate the main characteristics of the active recipe. The levels in the product tanks are reported in numerical form in the recipe bar 530, and in graphic form on the left of the screen. The target fill time for both product lines are reported on the right of the screen, and the ability to increase, decrease or stop the flow of bottles are provided through this interface screen. In addition, as will be discussed more below, the ability to sample the filling process is available through a button 2060 in connection with discussing the screen illustrated in FIG. 36.

Figure 32:
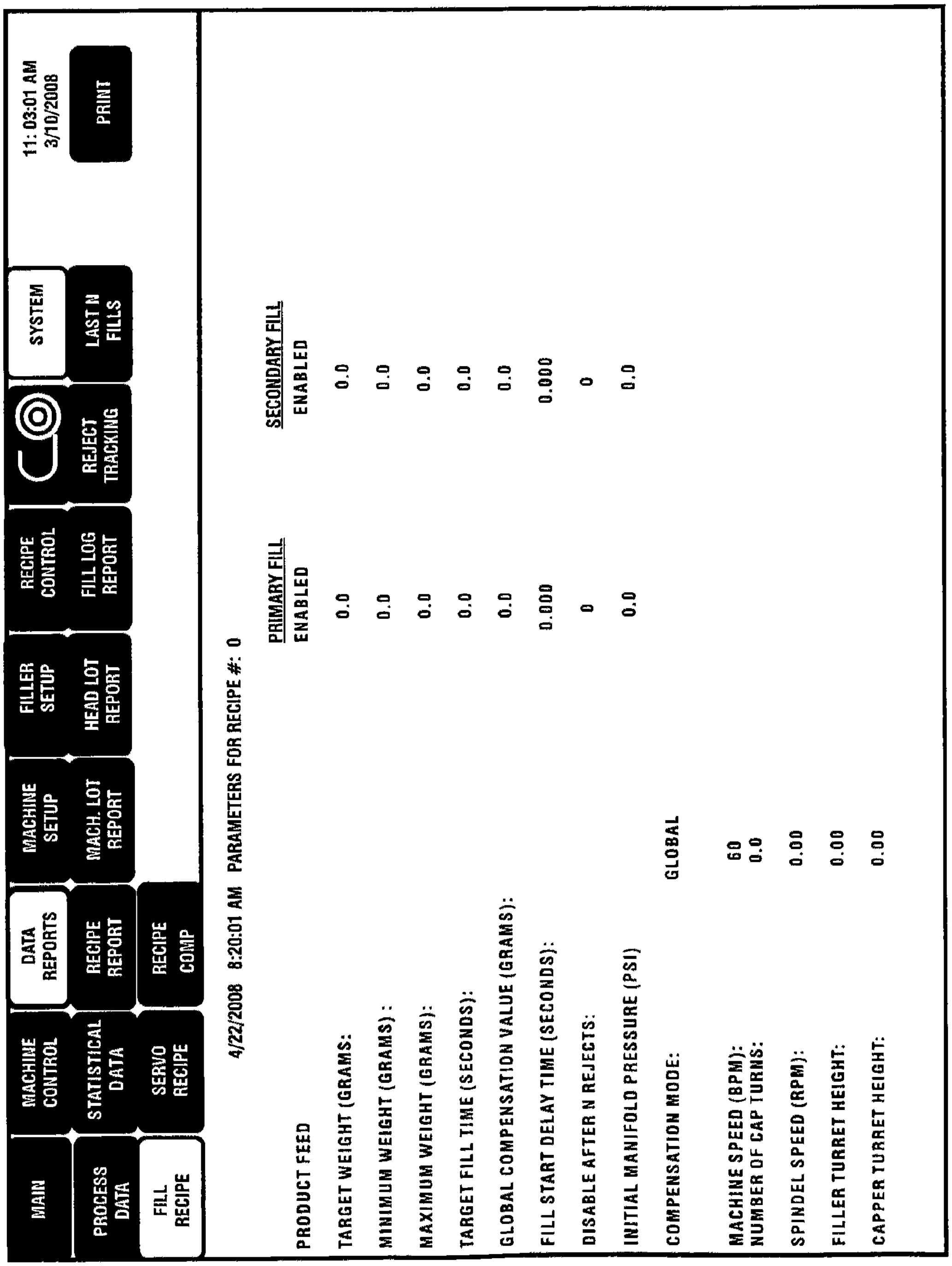
FIG. 32 is an exemplary Data Reports-Recipe Report-Fill Recipe screen of an exemplary program associated with the product supply system of FIG. 1.
Figure 33:
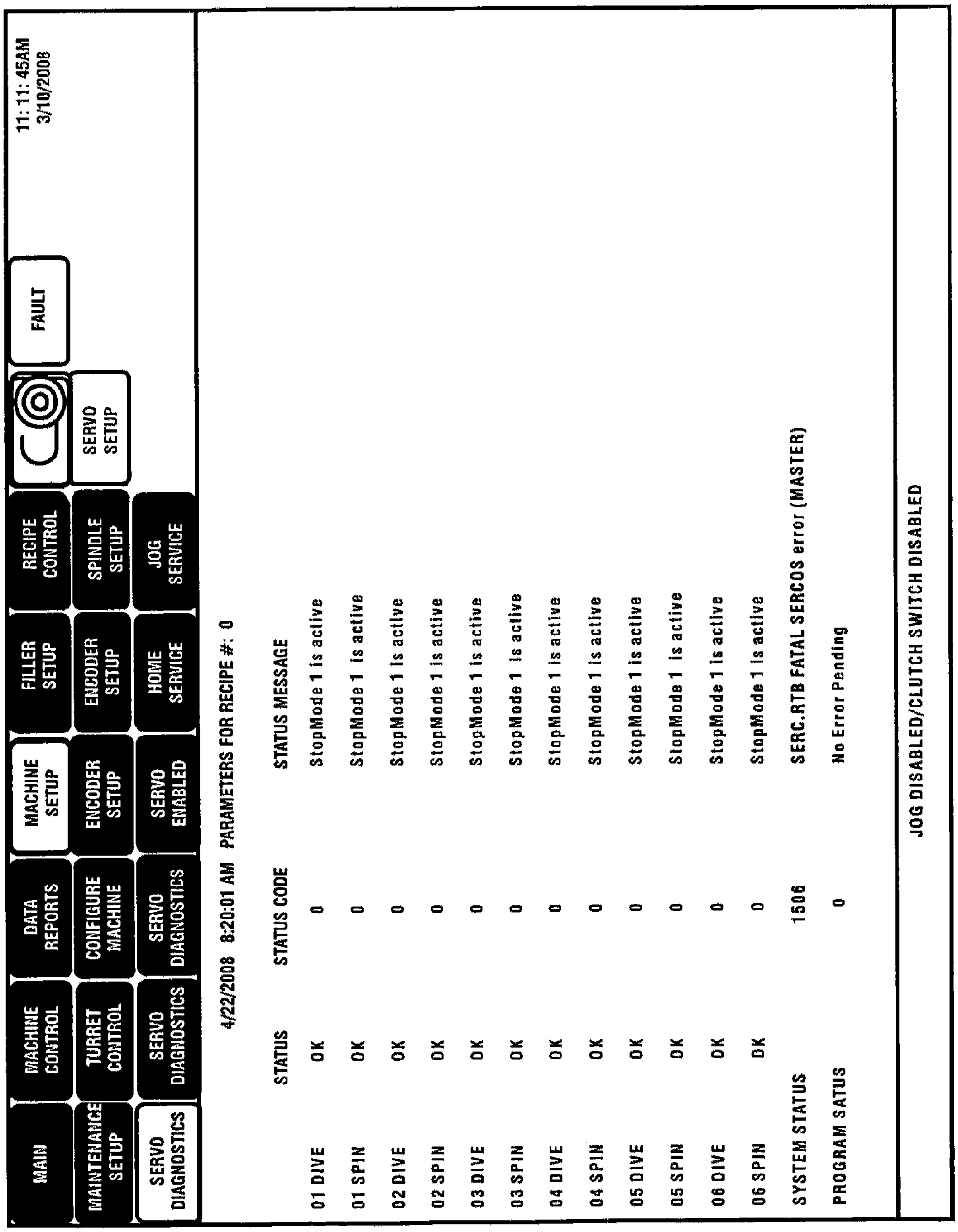
FIG. 33 is an exemplary Machine Setup-Servo Setup-Servo Diagnostics screen of an exemplary program associated with the product supply system of FIG. 1.
Figure 34:
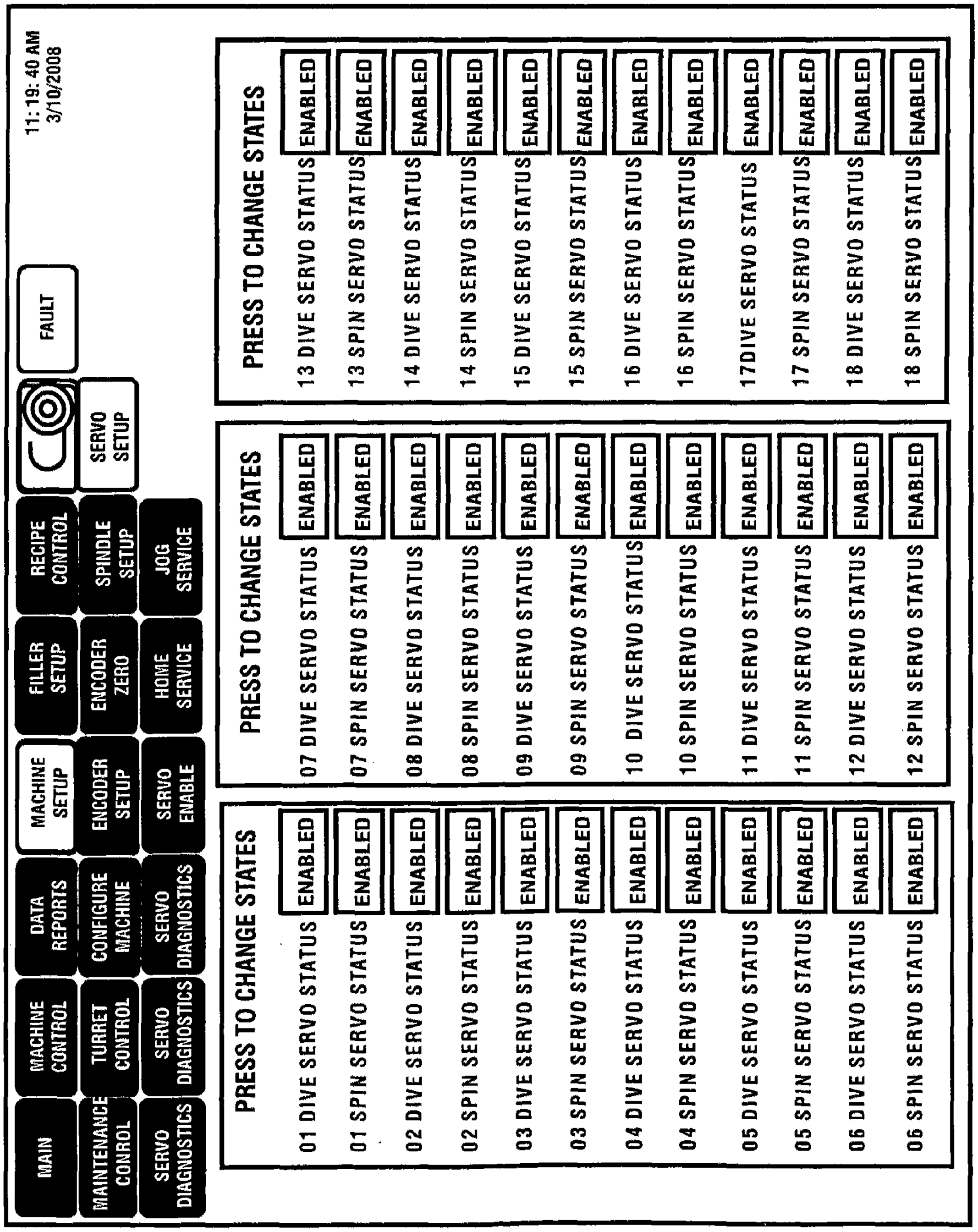
FIG. 34 is an exemplary Machine Setup-Servo Setup-Servo Enable screen of an exemplary program associated with the product supply system of FIG. 1.

An exemplary screen illustrated in FIG. 32 provides an overview of the active recipe being implemented. The exemplary screens in FIGS. 33 and 34 provide information about the status and programming of each of the filling stations.

Figure 25:
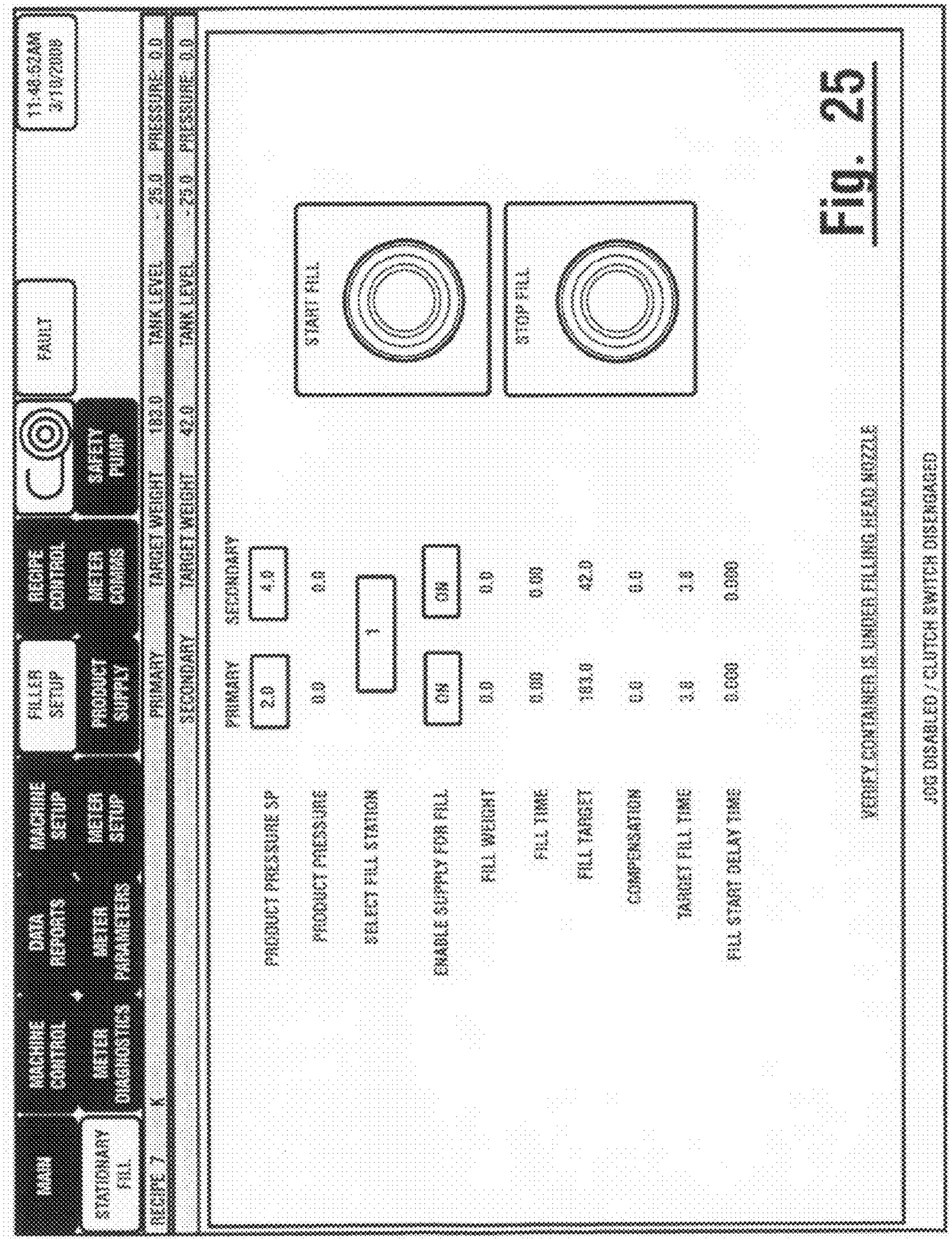
FIG. 25 is an exemplary Filler Setup-Stationary Fill screen of an exemplary program associated with the product supply system of FIG. 1.

Implementing a particular recipe to achieve consistent results may require the review of available information both from visually reviewing the filled containers and by using data that cannot be gained by a visual examination of the containers. This information is available from various reporting screens through the operators station 400. Preliminary information about the working of a particular recipe may be gained by temporarily operating the product supply system 5 as a stationary filling system. FIG. 25 is an exemplary stationary fill screen interface that may be used to test the implementation of a recipe as a stationary filler apparatus. The screen provides the basic information about the recipe, and allows the operator to fill a single container at a single fill station using the selected recipe.

Once a recipe is sufficiently refined to provide the desired appearance and weight in stationary operation, rotary operation may be started. The exemplary product supply system 5 is programmed to provide information about the operation of the product supply system 5 to the operator in a variety of formats. Primary and secondary data is made available about the performance of the system as a whole, as well as similar data for the performance of each individual filling station 105 and filling head 180, 190. In addition, primary and secondary performance data is also available for a single rotation of the filler apparatus, as well as for a plurality of rotations.

Figure 18:
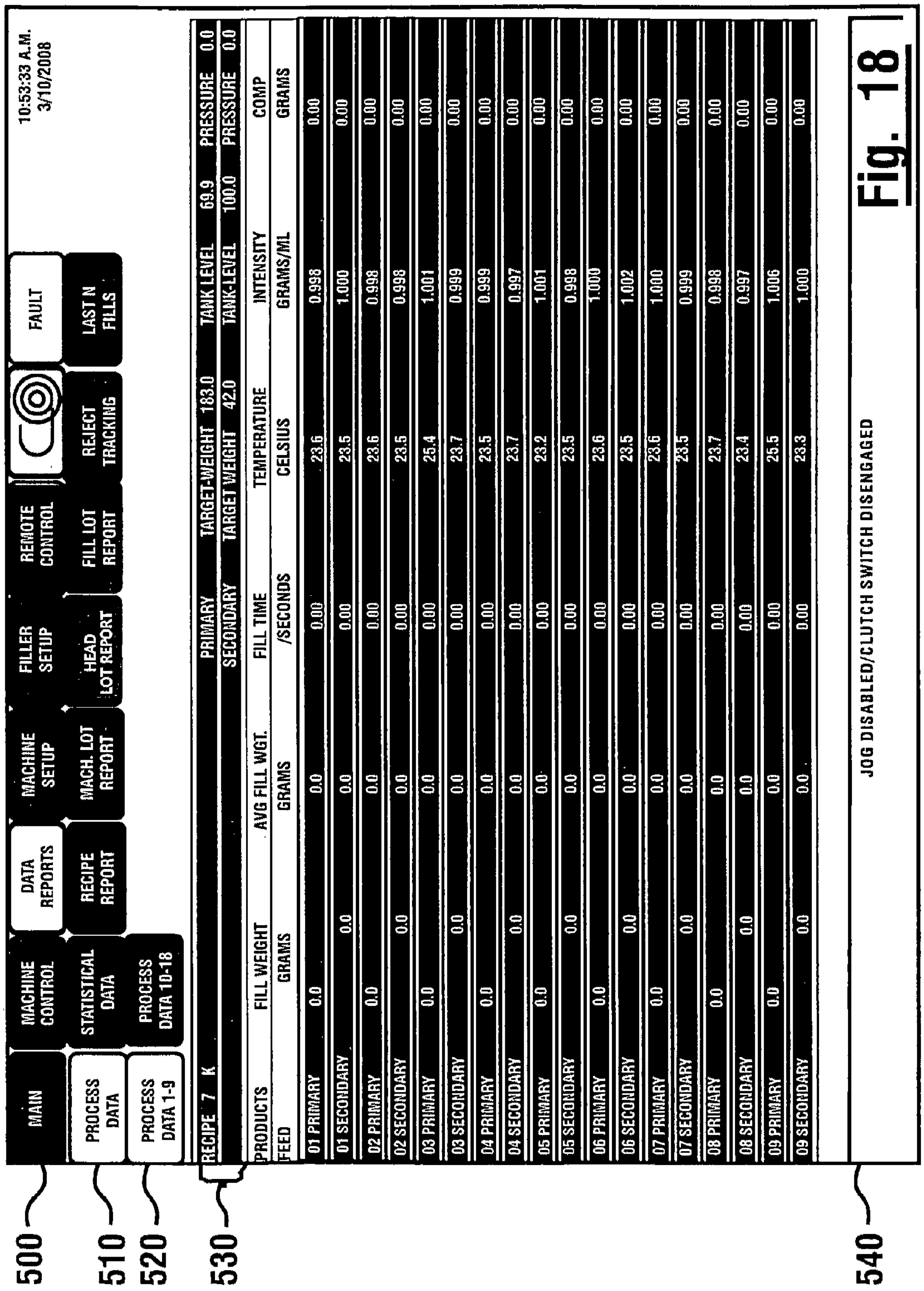
FIG. 18 is an exemplary Data Reports-Process Data-Process Data screen of an exemplary program associated with the product supply system of FIG. 1 for filling stations 1-9.
Figure 30:
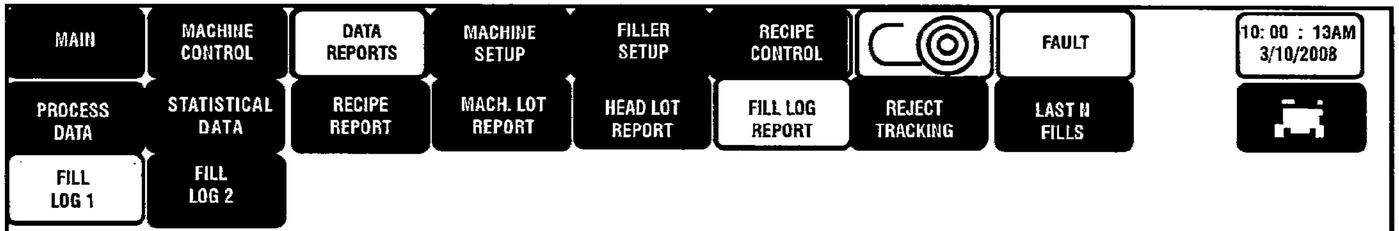
FIG. 30 is an exemplary Data Reports-Filling Log Report-Fill Log 1 screen of an exemplary program associated with the product supply system of FIG. 1 for filling stations 1-9.

FIGS. 18 and 30 show an exemplary screens containing information about the individual feeds by each filling station 105 station and each filling head 180, 190. Information available includes fill weight, fill time, temperature, density, and compensation. The exemplary screen shown in FIG. 18 provides more information about the recipe being implemented; the exemplary screen in FIG. 30 provides more information about the date and time of the report.

Figure 26:
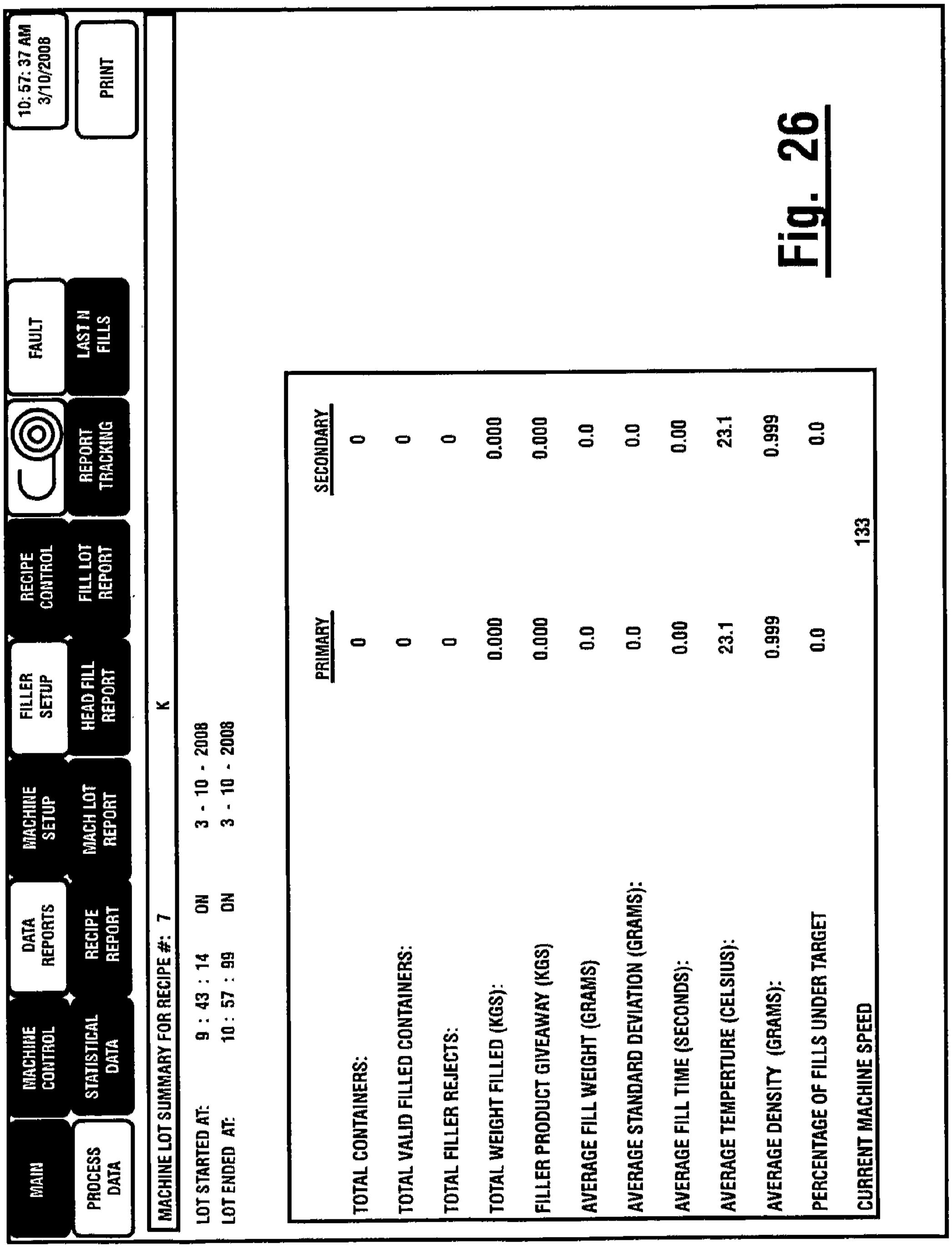
FIG. 26 is an exemplary Data Reports-Machine Lot Report screen of an exemplary program associated with the product supply system of FIG. 1.
Figure 27:
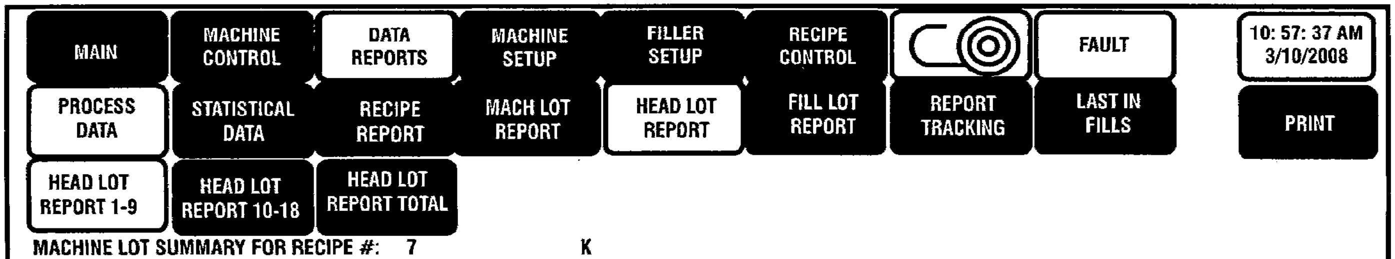
FIG. 27 is an exemplary Data Reports-Head Lot Report-Head Lot Report screen of an exemplary program associated with the product supply system of FIG. 1 for filling stations 1-9.
Figure 28:
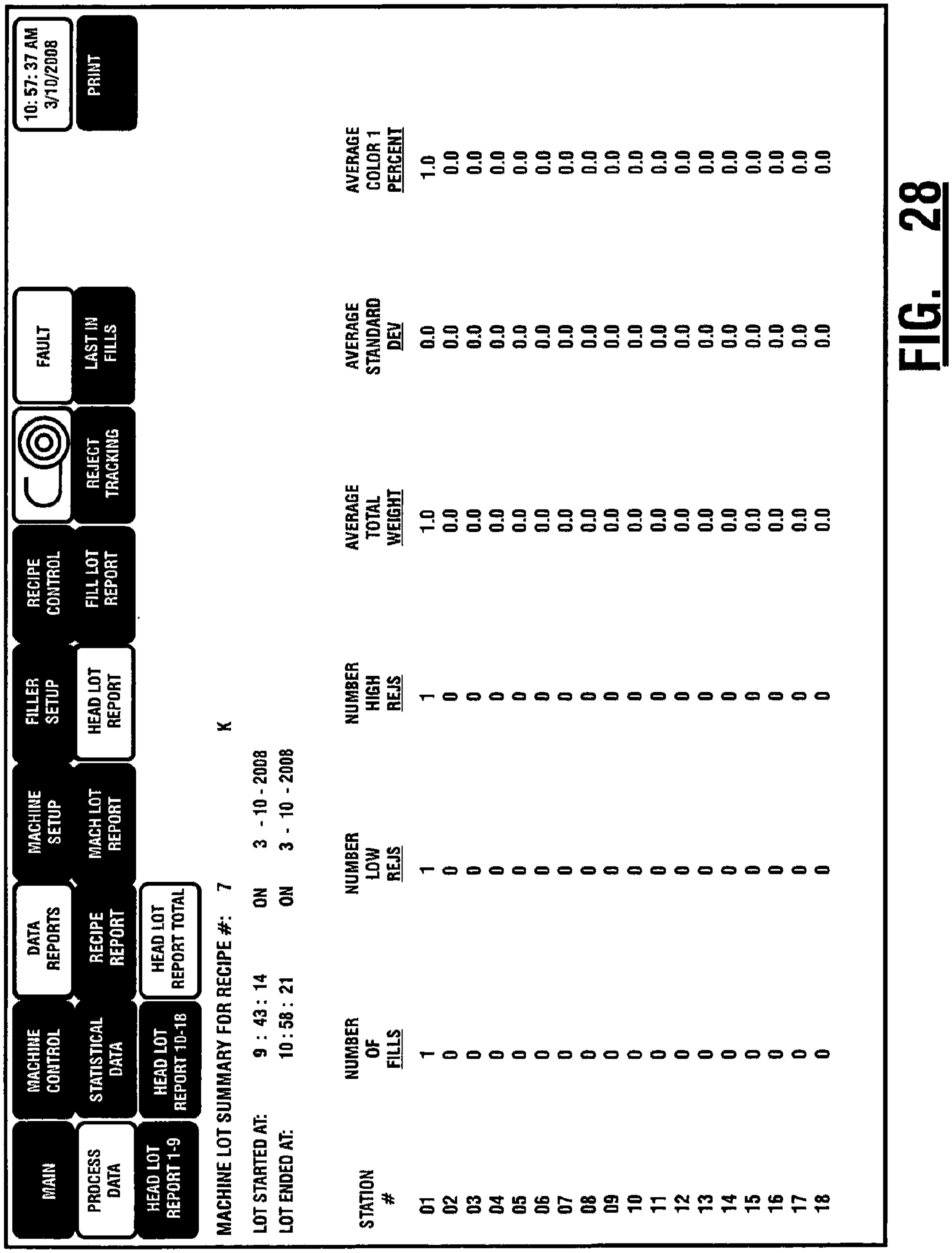
FIG. 28 is an exemplary Data Reports-Head Lot Report-Head Lot Report Total screen of an exemplary program associated with the product supply system of FIG. 1.
Figure 29:
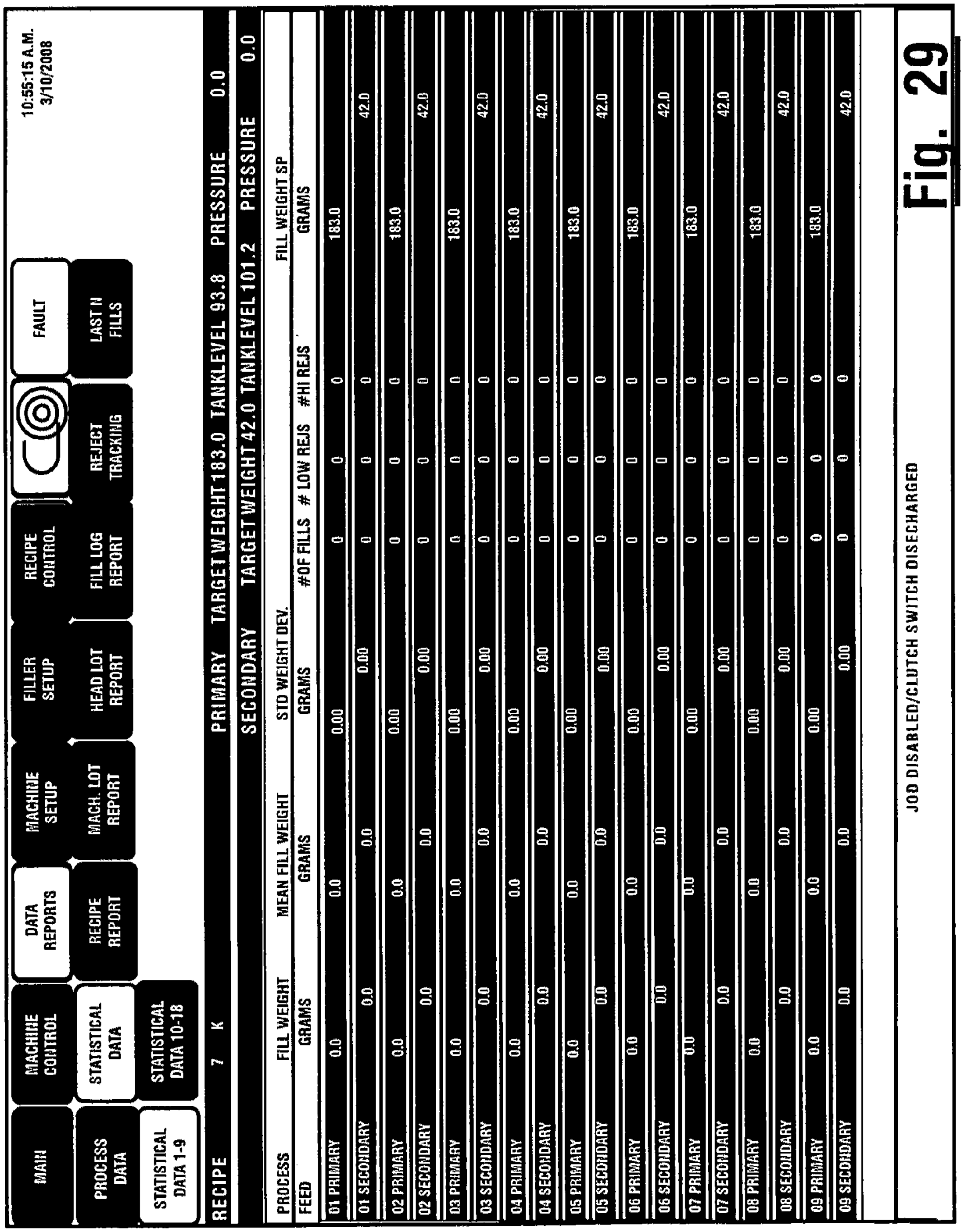
FIG. 29 is an exemplary Data Reports-Statistical Data-Statistical Data screen of an exemplary program associated with the product supply system of FIG. 1 for filling stations 1-9.

FIGS. 26-28 show exemplary screens containing information about the performance of the product supply system 5 with respect to a "lot" of containers. The exemplary screen shown in FIG. 26 provides information primarily about the operation as a whole, including lot size, time, and average statistical information about performance. The statistical information includes information about containers filled, containers rejected, fill time, temperature, density, speed, and under or over fills. If more detail is needed, the operator may review exemplary screens which are shown in FIG. 27 and FIG. 28 which provide similar information by filling head and station, respectively, in addition to information about how each filling station or filling head differs from the average performance. The exemplary screen shown in FIG. 29 displays average information about the lot (or a sizeable portion of the lot) similar to the information shown in the exemplary screen in FIG. 27, in addition to displaying the information side by side with the information about the weight of the most recent fill and how that weight varies from the average. The exemplary screen shown in FIG. 37 displays filling information about each of the "Last N" containers filled, in this exemplary embodiment, for up to each of the last 54 containers. The information displayed includes the filling station number, time, temperature, and weight of the delivered product and PSI for both the primary and secondary products.

Figure 31:
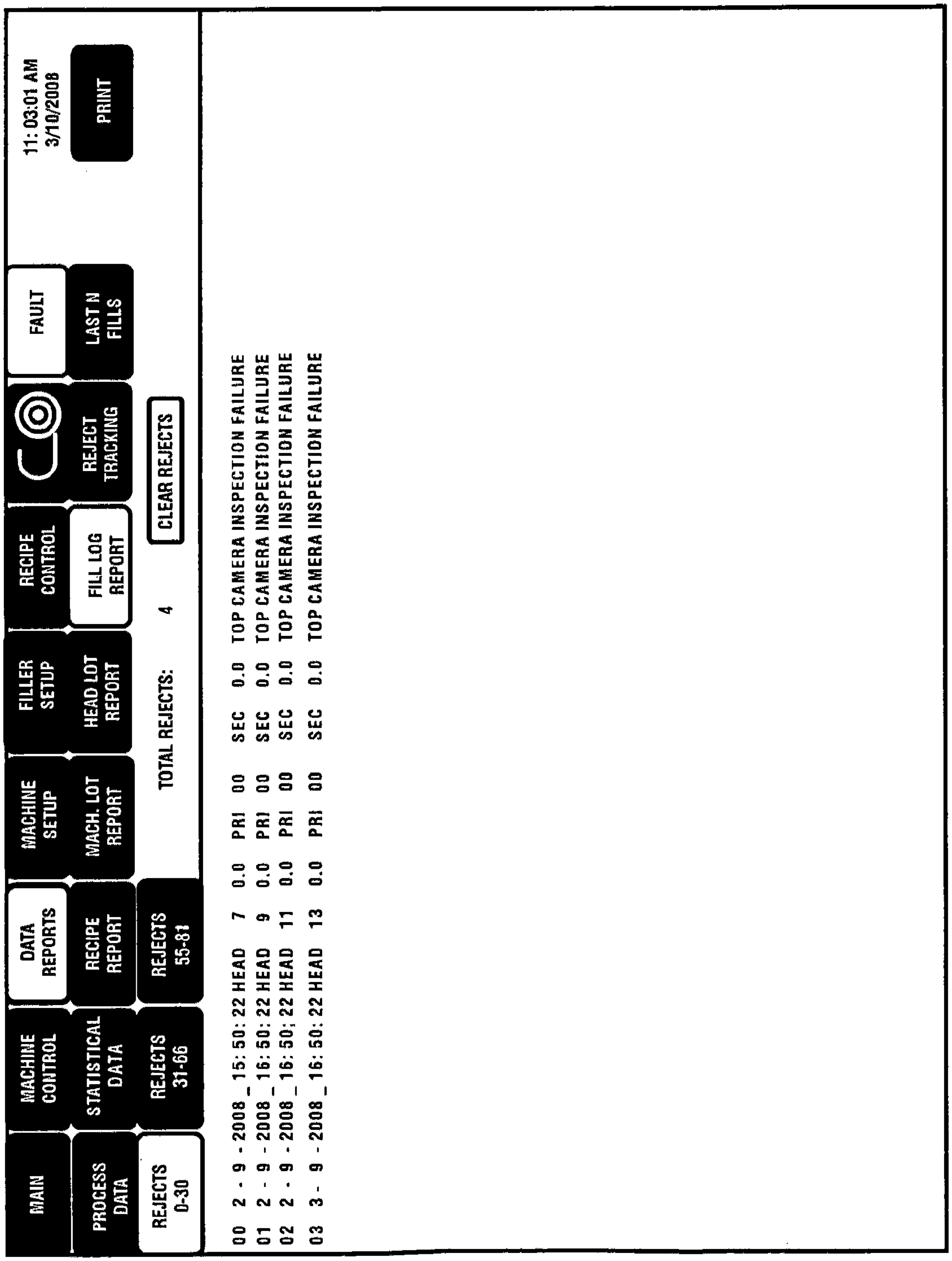
FIG. 31 is an exemplary Data Reports-Reject Tracking-Rejects 1-30 screen of an exemplary program associated with the product supply system of FIG. 1.

Finally, in addition to general performance in connection with implementing one or more recipes, it may also be useful to have specific information about problems that arise. The exemplary embodiment illustrated provides information specific to the filling operation in the form of a reject tracking report illustrated in FIG. 31 which provides detailed information about the reason each container was rejected. It also provides general information about system faults shown in exemplary form in FIG. 36.

The menus, sub-menus, reports, and control screens discussed herein are an exemplary embodiment of a menu structure that permits an operator of an exemplary product supply system 5 to program, monitor, and adjust the operation of the PLC controlled system. As discussed herein, a plurality of main tabs and associated menus each provides access to a second tier of tabs. Each main tab corresponds to a logically related group of sub-menus or report and/or interface screens. The second tier of tabs and associated menus and/or report or control screens each may provide access to a third tier of tabs. As with the first tier, each tab in the second tier provides access to a logically related group of sub-menus or report and/or interface screens. From a substantive perspective, the screen visible to the operator is one associated with the selected tab in the lowest tier of tabs visible on the screen. That screen may provide primary data, secondary data, a user interface that permits the operator to direct the PLCs control of the product filler supply system through the operator's station, or some combination thereof. The screen may also provide additional information through message bars that remain, more or less, constant over a plurality of screens. As each tier of more refined information or control is accessed, the preceding more general tier remains available via the layer of tabs in the next row up. In addition to accessing screen-based information via the tabs, additional data or control screens may be available as pop-up windows.

Not all screens that may be necessary to control or monitor the entire operation of a product supply system 5 are discussed herein, as the general operation, monitoring, and control rotary filling and capping operations is well known in the art. The particular arrangement of screens, the information which is provided, or control which is accessible from the screens related to the controlled filling a single container with two distinct products may be modified without undue experimentation to provide different information, different control, or in a different format which may prove to be more useful for a particular filling operation.

Thus the new filler product supply system and method of the present invention achieves the above stated objectives, eliminates difficulties encountered in the use of prior devices and systems, solves problems and attains the desirable results described herein.

In the foregoing description certain terms have been used for brevity, clarity and understanding, however, no unnecessary limitations are to be implied there from because such terms are for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means capable of performing the recited function, and shall not be limited to the structures shown herein or mere equivalents.

Having described the features, discoveries and principles of the invention, the manner in which it is constructed and operated, and the advantages and useful results attained, the new and useful structures, devices, elements, arrangements, parts, combinations, systems, equipment, operations and relationships are set forth in the appended claims.

We claim:

1. A system for supplying a plurality of fluids to a container comprising at least one filling station including:

a plurality of conduits in fluid isolation from each other, a plurality of flowmeters in one-to-one correspondence with the plurality of conduits, a plurality of filling heads in one-to-one correspondence with the plurality of conduits, and at least one nozzle in fluid connection with a plurality of filling heads which nozzle is adapted to deliver a plurality of previously isolated fluids received from the conduits in a non-homogeneous stream;

at least one controller in operative connection with each of the plurality of flowmeters and with each of the plurality of filling heads, and which is adapted to individually cause each of the plurality of flowmeters to control the flow of a fluid through said filling head, and which is further adapted to receive and transmit data; and at least one operator station in communication with the at least one controller, the at least one operator station comprising a computer, a recipe, and a software application operative, responsive to data received from the at least one controller to direct at least one of the plurality of flowmeters to cause each of the plurality of filling heads in the at least one filling station to control the flow of fluid through each such filling head in accordance with the recipe.

2. The system of claim 1 in which each of the at least one filling stations is in one to one correspondence with:

a platform which is adapted to support a container in vertical alignment with the nozzle thereby permitting the previously isolated fluids to be delivered into the container supported by such platform.

3. The system of claim 2 in which the system includes a plurality of filling stations and associated platforms.

4. The system of claim 2 in which the nozzle in at least one of the at least one filling stations has an axis, and in which the controller causes the corresponding platform selectively to be held in fixed rotational relation to the axis of the nozzle, to rotate clockwise in relation to the axis of the nozzle, or to rotate counterclockwise in relation to the axis of the nozzle, in accordance with the recipe.

5. The system of claim 2 in which flowmeters, filling heads, nozzles, and platforms comprise mechanical components of the system, and in which at least one of the at least one controllers is in operative connection with, and adapted to cause, one or more of the mechanical components to operate in accordance with the recipe.

6. The system of claim 5 in which the recipe includes data representative of a plurality of characteristics associated with mechanical components of the system.

7. The system of claim 6 in which the plurality of characteristics include rotation associated with at least one platform, target quantity of product to be delivered associated with at least one flowmeter, initial pressure associated with at least one product, and target fill time associated with at least one filling station.

8. The system of claim 6 in which the plurality of characteristics includes a plurality of characteristics associated with at least one filling station, which characteristics include nozzle dive distance to start of fill, number of fill regions, time spent in each fill region, and depth of each fill region.

9. The system of claim 2 in which the plurality of filling heads in at least one of the at least one filling stations includes a first and second filling head, and in which the recipe includes:

a quantity of fluid to be delivered by the first filling head; and a quantity of fluid to be delivered by the second filling head.

10. The system of claim 9 in which the recipe further includes a target filling time associated with the at least one filling station.

11. The system of claim 10 in which the recipe further includes, with respect to at least one of the at least one filling stations, at least two distinct fill regions and data corresponding to characteristics associated with each such fill regions.

12. The system of claim 11 in which the data is representative of one or more of the following: quantity of rotation of the platform, direction of rotation of the platform, depth of a fill region, and time spent in a fill region.

13. The system of claim 9, in which:

the recipe further includes, for each filling head in at least one of the at least one filling stations, data representative of a maximum quantity of fluid and of a minimum quantity of fluid to be dispensed during an acceptable fill, and the software application is adapted, responsive to data received from the flowmeter associated with each filling head, to cause at least one of the at least one controllers to cause the system to reject a container into which less than the minimum or more than the maximum quantity of any fluid has been transferred.

14. The system of claim 13 in which the recipe further includes data representative of a maximum acceptable number of rejected containers associated with at least one filling station, and the application is further adapted to store data representative of the number of rejected containers associated with the at least one filling station and, responsive to such data, to cause at least one of the controllers to disable the at least one filling station if the number of rejected containers exceeds the maximum acceptable number of rejected containers.

15. A method for controlling the appearance of the fluid contents of a container by using a computer implemented recipe to monitor and control the operation of a filling apparatus which has been adapted to introduce two previously isolated fluids into a container through a single nozzle by (a) initiating the flow of a first product stream through a first filling head;

(b) initiating the flow of a second product stream through a second filling head;

(c) combining the second product stream into the first product stream after the first filling head and before a nozzle;

(d) capturing data representative of the quantity of product which has passed through each filling head;

(e) responsive to the data, stopping the flow of a first product stream through a first filling head; and (f) responsive to the data, stopping the flow of a second product stream through the second filling head.

16. The method of claim 15, wherein step (a) and step (b) take place simultaneously.

17. The method of claim 15 wherein step (a) and step (b) do not take place simultaneously.

18. The method of claim 15 further including, before step (a), providing a recipe to be implemented.

19. The method of claim 18 wherein providing a recipe comprises retrieving a pre-existing recipe from a database of recipes.

20. The method of claim 18 wherein providing a recipe comprises modifying a pre-existing recipe selected from a database of recipes.

21. The method of claim 18 wherein providing the recipe comprises entering, through a user interface, recipe characteristics including target fill weight for a first product, target fill weight for a second product, target fill time, start delay for a first or second product, direction of container rotation, and angular velocity of container rotation.

22. The method of claim 21 wherein the recipe characteristics further include the number of filling regions, direction of container rotation and angular velocity of container rotation.

* * * * *